(12) United States Patent
Downie et al.

(10) Patent No.: US 9,563,832 B2
(45) Date of Patent: Feb. 7, 2017

(54) EXCESS RADIO-FREQUENCY (RF) POWER STORAGE AND POWER SHARING RF IDENTIFICATION (RFID) TAGS, AND RELATED CONNECTION SYSTEMS AND METHODS

(71) Applicant: Corning Incorporated, Corning, NY (US)

(72) Inventors: John David Downie, Painted Post, NY (US); James Scott Sutherland, Corning, NY (US); James Patrick Trice, Corning, NY (US); Richard Edward Wagner, Painted Post, NY (US); Matthew Scott Whiting, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 354 days.

(21) Appl. No.: 13/836,342

(22) Filed: Mar. 15, 2013

(65) Prior Publication Data
US 2014/0097254 A1 Apr. 10, 2014

Related U.S. Application Data

(60) Provisional application No. 61/710,843, filed on Oct. 8, 2012.

(51) Int. Cl.
*G06K 19/07* (2006.01)
*G06K 19/077* (2006.01)

(52) U.S. Cl.
CPC ....... *G06K 19/0715* (2013.01); *G06K 19/0704* (2013.01); *G06K 19/0705* (2013.01); *G06K 19/07749* (2013.01)

(58) Field of Classification Search
USPC ........................................................ 235/492
See application file for complete search history.

(56) References Cited

U.S. PATENT DOCUMENTS

| | | |
|---|---|---|
| 3,052,842 A | 9/1962 | Frohman, Jr. et al. |
| 3,609,742 A | 9/1971 | Burdick |

(Continued)

FOREIGN PATENT DOCUMENTS

| | | |
|---|---|---|
| CN | 101095152 A | 12/2007 |
| CN | 101268497 A | 9/2008 |

(Continued)

OTHER PUBLICATIONS

Office Action for Chinese patent application 200980105750.2 mailed Aug. 31, 2012, 25 pages.

(Continued)

*Primary Examiner* — Michael G Lee
*Assistant Examiner* — David Tardif
(74) *Attorney, Agent, or Firm* — Gregory V. Bean

(57) ABSTRACT

Excess radio-frequency (RF) power storage and power sharing RF Identification (RFID) tags, and related RFID tag connection systems and methods are disclosed. The excess RF power storage and power sharing RFID tags and related RFID tag connection systems and methods in embodiments disclosed herein allow connected RFID tags to store excess energy derived from excess received RF power in a shared energy storage device. In this manner, an individual RFID tag or a group of connected RFID tags in the RFID tag connection system can continue operation during temporary times when sufficient RF power is not being received from a RFID reader. Sharing stored energy derived from excess received RF power in a shared energy storage device among connected RFID tags in a RFID tag connection system can significantly mitigate problems of RF power interruption.

26 Claims, 18 Drawing Sheets

(56) References Cited

U.S. PATENT DOCUMENTS

| | | |
|---|---|---|
| 3,771,098 A | 11/1973 | Dempsey |
| 3,781,862 A | 12/1973 | Yamamura |
| 3,931,574 A | 1/1976 | Curtis, Jr. et al. |
| 3,942,859 A | 3/1976 | Korodi |
| 4,019,128 A | 4/1977 | Chebowski |
| 4,200,862 A | 4/1980 | Campbell et al. |
| 4,365,238 A | 12/1982 | Kollin |
| 4,418,333 A | 11/1983 | Schwarzbach et al. |
| 4,520,348 A | 5/1985 | Swanson |
| 4,578,636 A | 3/1986 | Bakke et al. |
| 4,626,633 A | 12/1986 | Ruehl et al. |
| 4,630,886 A | 12/1986 | Lauriello et al. |
| 4,889,977 A | 12/1989 | Haydon et al. |
| 4,915,639 A | 4/1990 | Cohn et al. |
| 4,924,213 A | 5/1990 | Decho et al. |
| 4,937,529 A | 6/1990 | O'Toole, III et al. |
| 4,968,929 A | 11/1990 | Hauck et al. |
| 4,978,317 A | 12/1990 | Pocrass |
| 5,081,627 A | 1/1992 | Yu |
| 5,185,570 A | 2/1993 | Fitzpatrick |
| 5,199,093 A | 3/1993 | Longhurst |
| 5,222,164 A | 6/1993 | Bass, Sr. et al. |
| 5,244,409 A | 9/1993 | Guss, III et al. |
| 5,260,694 A | 11/1993 | Remahl |
| 5,265,187 A | 11/1993 | Morin et al. |
| 5,297,015 A | 3/1994 | Miyazaki et al. |
| 5,305,405 A | 4/1994 | Emmons et al. |
| 5,337,400 A | 8/1994 | Morin et al. |
| 5,353,367 A | 10/1994 | Czosnowski et al. |
| 5,381,137 A | 1/1995 | Ghaem et al. |
| 5,394,503 A | 2/1995 | Dietz, Jr. et al. |
| 5,398,932 A | 3/1995 | Eberhardt et al. |
| 5,418,334 A | 5/1995 | Williams |
| 5,448,675 A | 9/1995 | Leone et al. |
| 5,461,693 A | 10/1995 | Pimpinella |
| 5,473,715 A | 12/1995 | Schofield et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,602,538 A | 2/1997 | Orthmann et al. |
| 5,613,873 A | 3/1997 | Bell, Jr. |
| 5,638,818 A | 6/1997 | Diab et al. |
| 5,640,151 A | 6/1997 | Reis et al. |
| 5,645,440 A | 7/1997 | Tobler et al. |
| 5,660,567 A | 8/1997 | Nierlich et al. |
| 5,661,470 A | 8/1997 | Karr |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,764,043 A | 6/1998 | Czosnowski et al. |
| 5,782,757 A | 7/1998 | Diab et al. |
| 5,797,767 A | 8/1998 | Schell |
| 5,798,711 A | 8/1998 | Issa et al. |
| 5,821,510 A | 10/1998 | Cohen et al. |
| 5,842,045 A | 11/1998 | Nakamura |
| 5,847,557 A | 12/1998 | Fincher et al. |
| 5,854,824 A | 12/1998 | Bengal et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black et al. |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh et al. |
| 5,995,855 A | 11/1999 | Kiani et al. |
| 5,999,400 A | 12/1999 | Belopolsky et al. |
| 6,002,331 A | 12/1999 | Laor et al. |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,126,610 A | 10/2000 | Rich et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,163,278 A | 12/2000 | Janman |
| 6,164,551 A | 12/2000 | Altwasser et al. |
| 6,174,194 B1 | 1/2001 | Bleicher et al. |
| 6,217,371 B1 | 4/2001 | Wu |
| 6,222,908 B1 | 4/2001 | Bartolutti et al. |
| 6,222,975 B1 | 4/2001 | Gilbert et al. |
| 6,224,417 B1 | 5/2001 | Belopolsky et al. |
| 6,227,911 B1 | 5/2001 | Boutros et al. |
| 6,232,870 B1 | 5/2001 | Garber et al. |
| 6,234,830 B1 | 5/2001 | Ensz et al. |
| 6,241,550 B1 | 6/2001 | Laity et al. |
| 6,243,654 B1 | 6/2001 | Johnson et al. |
| 6,256,523 B1 | 7/2001 | Diab et al. |
| 6,275,681 B1 | 8/2001 | Vega et al. |
| 6,280,213 B1 | 8/2001 | Tobler et al. |
| 6,285,293 B1 | 9/2001 | German et al. |
| 6,298,255 B1 | 10/2001 | Cordero et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,330,307 B1 | 12/2001 | Bloch et al. |
| 6,349,228 B1 | 2/2002 | Kiani et al. |
| 6,350,148 B1 | 2/2002 | Bartolutti et al. |
| 6,352,446 B2 | 3/2002 | Ezawa et al. |
| 6,354,884 B1 | 3/2002 | Yeh et al. |
| 6,368,155 B1 | 4/2002 | Bassler et al. |
| 6,375,362 B1 | 4/2002 | Heiles et al. |
| 6,377,203 B1 | 4/2002 | Doany |
| 6,378,111 B1 | 4/2002 | Brenner et al. |
| 6,402,743 B1 | 6/2002 | Orszulak et al. |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,469,404 B1 | 10/2002 | Pohjola |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,522,737 B1 | 2/2003 | Bartolutti et al. |
| 6,541,756 B2 | 4/2003 | Schulz et al. |
| 6,543,940 B2 | 4/2003 | Chu |
| 6,556,761 B1 | 4/2003 | Jennings et al. |
| 6,574,586 B1 | 6/2003 | David et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,621,410 B1 | 9/2003 | Lastinger et al. |
| 6,655,988 B1 | 12/2003 | Simmons et al. |
| 6,663,417 B1 | 12/2003 | Hung |
| 6,684,179 B1 | 1/2004 | David |
| 6,685,701 B2 | 2/2004 | Orszulak et al. |
| 6,688,908 B2 | 2/2004 | Wallace |
| 6,688,910 B2 | 2/2004 | Macauley |
| 6,693,513 B2 | 2/2004 | Tuttle |
| 6,696,952 B2 | 2/2004 | Zirbes |

(56) References Cited

U.S. PATENT DOCUMENTS

| | | | |
|---|---|---|---|
| 6,725,177 B2 | 4/2004 | David et al. |
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,773,306 B2 | 8/2004 | Plishner |
| 6,784,802 B1 | 8/2004 | Stanescu |
| 6,798,956 B2 | 9/2004 | Morrison |
| 6,808,116 B1 | 10/2004 | Eslambolchi et al. |
| 6,829,427 B1 | 12/2004 | Becker |
| 6,831,443 B2 | 12/2004 | Liu |
| 6,846,115 B1 | 1/2005 | Shang et al. |
| 6,847,856 B1 | 1/2005 | Bohannon |
| 6,857,897 B2 | 2/2005 | Conn |
| 6,866,424 B2 | 3/2005 | Tanaka et al. |
| 6,871,156 B2 | 3/2005 | Wallace et al. |
| 6,881,096 B2 | 4/2005 | Brown et al. |
| 6,888,996 B2 | 5/2005 | Hwang et al. |
| 6,890,197 B2 | 5/2005 | Liebenow |
| 6,891,471 B2 | 5/2005 | Yuen et al. |
| 6,896,542 B2 | 5/2005 | Chang |
| 6,897,374 B2 | 5/2005 | Garber et al. |
| 6,898,368 B2 | 5/2005 | Colombo et al. |
| 6,899,626 B1 | 5/2005 | Luciano et al. |
| 6,900,629 B2 | 5/2005 | Hwang et al. |
| 6,902,433 B1 | 6/2005 | Hashimoto et al. |
| 6,910,917 B2 | 6/2005 | Chen |
| 6,913,481 B2 | 7/2005 | Marshall et al. |
| 6,915,050 B2 | 7/2005 | Koyasu et al. |
| 6,917,763 B1 | 7/2005 | Au et al. |
| 6,921,284 B2 | 7/2005 | Sirichai et al. |
| 6,923,689 B2 | 8/2005 | Xue et al. |
| 6,924,781 B1 | 8/2005 | Gelbman |
| 6,924,997 B2 | 8/2005 | Chen et al. |
| 6,961,675 B2 | 11/2005 | David |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,975,242 B2 | 12/2005 | Dannenmann et al. |
| 6,979,223 B2 | 12/2005 | Chen |
| 6,992,567 B2 | 1/2006 | Cole et al. |
| 6,999,028 B2 | 2/2006 | Egbert |
| 7,014,100 B2 | 3/2006 | Zierolf |
| 7,014,500 B2 | 3/2006 | Belesimo |
| 7,016,726 B1 | 3/2006 | Picardo et al. |
| 7,018,242 B2 | 3/2006 | Brown et al. |
| 7,024,089 B2 | 4/2006 | Weinert et al. |
| 7,026,936 B2 | 4/2006 | Roesner |
| 7,027,704 B2 | 4/2006 | Frohlich et al. |
| 7,028,087 B2 | 4/2006 | Caveney |
| 7,028,202 B2 | 4/2006 | Long et al. |
| 7,038,135 B1 | 5/2006 | Chan et al. |
| 7,044,949 B2 | 5/2006 | Orszulak et al. |
| 7,046,899 B2 | 5/2006 | Colombo et al. |
| 7,062,139 B2 | 6/2006 | Shang |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,096,077 B2 | 8/2006 | Price et al. |
| 7,102,520 B2 | 9/2006 | Liu et al. |
| 7,123,810 B2 | 10/2006 | Parrish |
| 7,132,641 B2 | 11/2006 | Schulz et al. |
| 7,140,782 B2 | 11/2006 | Frohlich et al. |
| 7,151,455 B2 | 12/2006 | Lindsay et al. |
| 7,158,031 B2 | 1/2007 | Tuttle |
| 7,158,033 B2 | 1/2007 | Forster |
| 7,160,143 B2 | 1/2007 | David et al. |
| 7,165,728 B2 | 1/2007 | Durrant et al. |
| 7,168,975 B2 | 1/2007 | Kuo |
| 7,170,393 B2 | 1/2007 | Martin |
| 7,173,345 B2 | 2/2007 | Brandt et al. |
| 7,193,422 B2 | 3/2007 | Velleca et al. |
| 7,194,180 B2 | 3/2007 | Becker |
| 7,205,898 B2 | 4/2007 | Dixon et al. |
| 7,207,846 B2 | 4/2007 | Caveney et al. |
| 7,209,042 B2 | 4/2007 | Martin et al. |
| 7,210,858 B2 | 5/2007 | Sago et al |
| 7,217,152 B1 | 5/2007 | Xin et al. |
| 7,221,277 B2 | 5/2007 | Caron et al. |
| 7,221,284 B2 | 5/2007 | Scherer et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,234,944 B2 | 6/2007 | Nordin et al. |
| 7,243,837 B2 | 7/2007 | Durrant et al. |
| 7,247,046 B1 | 7/2007 | Wu |
| 7,249,705 B2 | 7/2007 | Dudley |
| 7,251,570 B2 | 7/2007 | Hancock et al. |
| 7,252,538 B2 | 8/2007 | Garrett et al. |
| 7,253,735 B2 | 8/2007 | Gengel et al. |
| 7,265,674 B2 | 9/2007 | Tuttle |
| 7,275,970 B2 | 10/2007 | Hoshina |
| 7,285,007 B2 | 10/2007 | Barna |
| 7,294,786 B2 | 11/2007 | Aldereguia et al. |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster et al. |
| 7,298,946 B2 | 11/2007 | Mueller |
| 7,306,489 B2 | 12/2007 | Werthman et al. |
| 7,307,408 B2 | 12/2007 | Porcu et al. |
| 7,318,744 B2 | 1/2008 | Kuo |
| 7,319,397 B2 | 1/2008 | Chung et al. |
| 7,327,278 B2 | 2/2008 | Dannenmann et al. |
| 7,336,883 B2 | 2/2008 | Scholtz |
| 7,348,884 B2 | 3/2008 | Higham |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 7,375,616 B2 | 5/2008 | Rowse et al. |
| 7,411,500 B2 | 8/2008 | Hamerly et al. |
| 7,468,669 B1 | 12/2008 | Beck et al. |
| 7,504,945 B2 | 3/2009 | Cox et al. |
| 7,536,574 B2 | 5/2009 | Liu |
| 7,554,448 B2 | 6/2009 | Tomioka |
| 7,712,674 B1 | 5/2010 | Warner et al. |
| 7,757,936 B2 | 7/2010 | Aguren et al. |
| 7,760,094 B1 | 7/2010 | Kozischek et al. |
| 7,772,975 B2 | 8/2010 | Downie et al. |
| 7,782,202 B2 | 8/2010 | Downie et al. |
| 7,802,015 B2 | 9/2010 | Cheifot et al. |
| 7,965,186 B2 | 6/2011 | Downie et al. |
| 8,089,344 B1 | 1/2012 | Zand |
| 8,172,468 B2 | 5/2012 | Jones et al. |
| 8,179,259 B2 | 5/2012 | Bolotin et al. |
| 8,217,794 B2* | 7/2012 | Yoo ............... G06K 7/10178 235/384 |
| 8,264,366 B2 | 9/2012 | Chamarti et al. |
| 8,333,518 B2 | 12/2012 | Jones et al. |
| 8,421,626 B2 | 4/2013 | Downie et al. |
| 8,594,567 B2 | 11/2013 | Finkenzeller et al. |
| 2001/0008390 A1 | 7/2001 | Berquist et al. |
| 2001/0027055 A1 | 10/2001 | Laity et al. |
| 2001/0039140 A1 | 11/2001 | Fasold et al. |
| 2002/0071394 A1 | 6/2002 | Koziy et al. |
| 2002/0086584 A1 | 7/2002 | Liu |
| 2002/0090858 A1 | 7/2002 | Caveney |
| 2002/0092347 A1 | 7/2002 | Niekerk et al. |
| 2003/0021580 A1 | 1/2003 | Matthews |
| 2003/0058126 A1 | 3/2003 | Fling et al. |
| 2003/0061393 A1 | 3/2003 | Steegmans et al. |
| 2003/0100217 A1 | 5/2003 | Wu |
| 2003/0100218 A1 | 5/2003 | Tsai et al. |
| 2003/0148654 A1 | 8/2003 | Kan |
| 2003/0154273 A1 | 8/2003 | Caveney |
| 2003/0154276 A1 | 8/2003 | Caveney |
| 2003/0162414 A1 | 8/2003 | Schulz et al. |
| 2003/0179073 A1 | 9/2003 | Ghazarian |
| 2003/0211782 A1 | 11/2003 | Esparaz et al. |
| 2004/0041714 A1 | 3/2004 | Forster |

(56) References Cited

U.S. PATENT DOCUMENTS

| | | |
|---|---|---|
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0123998 A1 | 7/2004 | Berglund et al. |
| 2004/0149736 A1 | 8/2004 | Clothier |
| 2004/0184747 A1 | 9/2004 | Koyasu et al. |
| 2004/0189263 A1 | 9/2004 | Meier et al. |
| 2004/0253874 A1 | 12/2004 | Plishner |
| 2005/0021425 A1 | 1/2005 | Casey |
| 2005/0032415 A1 | 2/2005 | Sakamoto |
| 2005/0052174 A1 | 3/2005 | Angelo et al. |
| 2005/0052287 A1 | 3/2005 | Whitesmith et al. |
| 2005/0068156 A1 | 3/2005 | Chuang et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0098630 A1 | 5/2005 | Nakazawa |
| 2005/0111491 A1 | 5/2005 | Caveney |
| 2005/0130656 A1 | 6/2005 | Chen |
| 2005/0170784 A1 | 8/2005 | Ariyoshi et al. |
| 2005/0201450 A1 | 9/2005 | Volpi et al. |
| 2005/0215119 A1 | 9/2005 | Kaneko |
| 2005/0219050 A1 | 10/2005 | Martin |
| 2005/0224585 A1 | 10/2005 | Durrant et al. |
| 2005/0231325 A1 | 10/2005 | Durrant et al. |
| 2005/0232636 A1 | 10/2005 | Durrant et al. |
| 2005/0242950 A1 | 11/2005 | Lindsay et al. |
| 2005/0259930 A1 | 11/2005 | Elkins, II et al. |
| 2005/0260884 A1 | 11/2005 | Yueh |
| 2005/0280511 A1 | 12/2005 | Yokoyama et al. |
| 2005/0284358 A1 | 12/2005 | Laackmann |
| 2005/0285718 A1 | 12/2005 | Enguent |
| 2006/0006234 A1* | 1/2006 | Mizutani ............ G06K 7/10356 235/451 |
| 2006/0006999 A1 | 1/2006 | Walczyk et al. |
| 2006/0015233 A1 | 1/2006 | Olsen, III et al. |
| 2006/0019540 A1 | 1/2006 | Werthman et al. |
| 2006/0026316 A1 | 2/2006 | Milenkovic et al. |
| 2006/0039136 A1 | 2/2006 | Probasco et al. |
| 2006/0042984 A1 | 3/2006 | Suzuki |
| 2006/0044148 A1 | 3/2006 | Daniels et al. |
| 2006/0091207 A1 | 5/2006 | Chang |
| 2006/0139149 A1 | 6/2006 | Faro et al. |
| 2006/0145863 A1 | 7/2006 | Martin et al. |
| 2006/0148279 A1 | 7/2006 | German et al. |
| 2006/0153517 A1 | 7/2006 | Reagan et al. |
| 2006/0166546 A1 | 7/2006 | Ashizawa et al. |
| 2006/0206246 A1 | 9/2006 | Walker |
| 2006/0232419 A1 | 10/2006 | Tomioka et al. |
| 2006/0233506 A1 | 10/2006 | Noonan et al. |
| 2006/0257092 A1 | 11/2006 | Lu et al. |
| 2006/0267737 A1 | 11/2006 | Colby |
| 2006/0267778 A1 | 11/2006 | Gengel et al. |
| 2006/0275007 A1 | 12/2006 | Livingston et al. |
| 2006/0282529 A1 | 12/2006 | Nordin |
| 2006/0286856 A1 | 12/2006 | Sakamoto |
| 2006/0292311 A1 | 12/2006 | Kilburn et al. |
| 2007/0001807 A1 | 1/2007 | Malone et al. |
| 2007/0013487 A1 | 1/2007 | Scholtz et al. |
| 2007/0015410 A1 | 1/2007 | Siemon et al. |
| 2007/0018787 A1 | 1/2007 | Martinez de Velasco Cortina et al. |
| 2007/0023525 A1 | 2/2007 | Son et al. |
| 2007/0032124 A1 | 2/2007 | Nordin et al. |
| 2007/0055470 A1 | 3/2007 | Pietrzyk et al. |
| 2007/0057771 A1 | 3/2007 | Tomioka |
| 2007/0059975 A1 | 3/2007 | Walsh |
| 2007/0080783 A1 | 4/2007 | Ghosh et al. |
| 2007/0116411 A1 | 5/2007 | Benton et al. |
| 2007/0117450 A1 | 5/2007 | Truxes |
| 2007/0120684 A1 | 5/2007 | Utaka et al. |
| 2007/0152828 A1 | 7/2007 | Mohalik |
| 2007/0155223 A1 | 7/2007 | Huang et al. |
| 2007/0176745 A1 | 8/2007 | Gibson et al. |
| 2007/0196058 A1 | 8/2007 | Lee et al. |
| 2007/0200682 A1 | 8/2007 | Colby |
| 2007/0205897 A1 | 9/2007 | Forster |
| 2007/0205902 A1 | 9/2007 | Cote et al. |
| 2007/0210923 A1 | 9/2007 | Butler et al. |
| 2007/0216534 A1 | 9/2007 | Ferguson et al. |
| 2007/0236355 A1 | 10/2007 | Flaster et al. |
| 2007/0238343 A1 | 10/2007 | Velleca et al. |
| 2007/0241439 A1 | 10/2007 | Chung et al. |
| 2007/0247284 A1 | 10/2007 | Martin et al. |
| 2007/0273507 A1 | 11/2007 | Burchell et al. |
| 2008/0003867 A1 | 1/2008 | Wu |
| 2008/0021766 A1 | 1/2008 | McElwaine et al. |
| 2008/0030353 A1 | 2/2008 | O'Toole et al. |
| 2008/0032546 A1 | 2/2008 | Xuan et al. |
| 2008/0045075 A1 | 2/2008 | Caveney et al. |
| 2008/0048826 A1 | 2/2008 | Agrawal et al. |
| 2008/0090451 A1 | 4/2008 | Feldman |
| 2008/0100440 A1 | 5/2008 | Downie et al. |
| 2008/0100456 A1 | 5/2008 | Downie et al. |
| 2008/0100467 A1 | 5/2008 | Downie et al. |
| 2008/0106415 A1 | 5/2008 | Sellew et al. |
| 2008/0122641 A1 | 5/2008 | Amidi |
| 2008/0139306 A1 | 6/2008 | Lutnick et al. |
| 2008/0220721 A1 | 9/2008 | Downie et al. |
| 2008/0240724 A1 | 10/2008 | Aguren |
| 2009/0032577 A1 | 2/2009 | Aguren et al. |
| 2009/0079544 A1 | 3/2009 | Noble |
| 2009/0088077 A1 | 4/2009 | Brown et al. |
| 2009/0096581 A1 | 4/2009 | Macauley et al. |
| 2009/0224039 A1 | 9/2009 | Hause et al. |
| 2009/0240945 A1 | 9/2009 | Aronson |
| 2009/0261955 A1 | 10/2009 | Moore et al. |
| 2010/0019883 A1 | 1/2010 | Eom et al. |
| 2010/0080554 A1 | 4/2010 | Aguren |
| 2010/0134293 A1* | 6/2010 | Fujishiro ............ G08B 13/2417 340/572.7 |
| 2011/0050165 A1* | 3/2011 | Sato ................... G06K 19/0701 320/108 |
| 2011/0147468 A1 | 6/2011 | Park et al. |
| 2011/0266338 A1 | 11/2011 | Babcock et al. |
| 2011/0267194 A1 | 11/2011 | Hong et al. |
| 2012/0126949 A1 | 5/2012 | Downie et al. |
| 2012/0126950 A1 | 5/2012 | Downie et al. |
| 2012/0133490 A1 | 5/2012 | Downie et al. |
| 2013/0328666 A1 | 12/2013 | Renfro, Jr. et al. |

FOREIGN PATENT DOCUMENTS

| | | |
|---|---|---|
| DE | 19841738 A1 | 3/2000 |
| DE | 19920452 A1 | 11/2000 |
| DE | 10244304 B3 | 3/2004 |
| DE | 10249414 A1 | 5/2004 |
| EP | 0593131 A1 | 4/1994 |
| EP | 1455550 A2 | 9/2004 |
| EP | 1467232 A1 | 10/2004 |
| EP | 1686025 A2 | 8/2006 |
| EP | 1696680 A1 | 8/2006 |
| GB | 2347508 A | 9/2000 |
| GB | 2371211 A | 7/2002 |
| JP | 03242795 A | 10/1991 |
| JP | 04039483 A | 2/1992 |
| JP | 04174406 A | 6/1992 |
| JP | 08191257 A | 7/1996 |
| JP | 2001069625 A | 3/2001 |
| JP | 2001099946 A | 4/2001 |
| JP | 2002264617 A | 9/2002 |
| JP | 2003148653 A | 5/2003 |
| JP | 2003172827 A | 6/2003 |
| JP | 2003229215 A | 8/2003 |
| JP | 03284213 A | 10/2003 |
| JP | 2004038583 A | 2/2004 |
| JP | 2004039389 A | 2/2004 |
| JP | 2004142500 A | 5/2004 |
| JP | 2004214963 A | 9/2004 |
| JP | 2004247090 A | 9/2004 |
| JP | 2004247134 A | 9/2004 |
| JP | 2004264901 A | 9/2004 |
| JP | 2004265624 A | 9/2004 |
| JP | 2004265860 A | 9/2004 |

(56) References Cited

FOREIGN PATENT DOCUMENTS

| | | |
|---|---|---|
| JP | 2004265861 A | 9/2004 |
| JP | 2004266886 A | 9/2004 |
| JP | 2004317737 A | 11/2004 |
| JP | 2004349184 A | 12/2004 |
| JP | 2004361896 A | 12/2004 |
| JP | 2005018175 A | 1/2005 |
| JP | 2005033857 A | 2/2005 |
| JP | 2005050581 A | 2/2005 |
| JP | 2005084162 A | 3/2005 |
| JP | 2005086901 A | 3/2005 |
| JP | 2005087135 A | 4/2005 |
| JP | 2005092107 A | 4/2005 |
| JP | 2005134125 A | 5/2005 |
| JP | 2005216698 A | 8/2005 |
| JP | 2005234620 A | 9/2005 |
| JP | 2005302403 A | 10/2005 |
| JP | 2005315980 A | 11/2005 |
| JP | 2005339983 A | 12/2005 |
| JP | 2005341738 A | 12/2005 |
| JP | 2006054118 A | 2/2006 |
| JP | 2006101630 A | 4/2006 |
| JP | 2006245983 A | 9/2006 |
| JP | 2006279650 A | 10/2006 |
| JP | 2006344232 A | 12/2006 |
| JP | 2007087849 A | 4/2007 |
| JP | 2007088957 A | 4/2007 |
| JP | 2007158993 A | 6/2007 |
| JP | 2007189774 A | 7/2007 |
| JP | 2007221400 A | 8/2007 |
| JP | 2011123539 A | 6/2011 |
| WO | 0155991 A1 | 8/2001 |
| WO | 02097710 A1 | 12/2002 |
| WO | 03098175 A1 | 11/2003 |
| WO | 2004030154 A2 | 4/2004 |
| WO | 2006058119 A1 | 6/2006 |
| WO | 2006063023 A1 | 6/2006 |
| WO | 2006072840 A1 | 7/2006 |
| WO | 2007033294 A2 | 3/2007 |
| WO | 2008000656 A1 | 1/2008 |
| WO | 2008054742 A2 | 5/2008 |
| WO | 2008075123 A1 | 6/2008 |
| WO | 2008076235 A1 | 6/2008 |
| WO | 2008112169 A1 | 9/2008 |

OTHER PUBLICATIONS

Decision of rejection for Japanese patent application 2009-541316 issued Aug. 7, 2012, 10 pages.
Official Letter for Taiwanese patent application 098134450 mailed Oct. 3, 2012, 8 pages.
European Search Report for application 07867312.6 mailed Sep. 12, 2012, 12 pages.
European Search Report for application 07867314.2 mailed Sep. 12, 2012, 11 pages.
First Office Action for Chinese Patent application 200980131993.3 mailed Feb. 1, 2013, 8 pages.
First Office Action for Chinese Patent application 200980139124.5 mailed Mar. 4, 2013, 24 pages.
Examination Report for European Patent Application 09701815.4 mailed Mar. 21, 2013, 4 pages.
Non-final Office Action for U.S. Appl. No. 13/588,079 mailed May 14, 2013, 13 pages.
Non-final Office Action for U.S. Appl. No. 12/229,964 mailed Aug. 5, 2013, 10 pages.
First Office Action for Chinese patent application 200780050180.2 mailed Nov. 15, 2011, 11 pages.
Third Office Action for Chinese patent application 200780050180.2 mailed Oct. 25, 2012, 7 pages.
Second Office Action for Chinese patent application 200980105750.2 mailed May 9, 2013, 5 pages.
First Office Action for Chinese patent application 200980144859.7 mailed Jun. 20, 2013, 9 pages.
Examination Report for European Patent Application 09701815.4 mailed Apr. 14, 2011, 6 pages.
International Search Report and Written Opinion for PCT/US2007/025136 mailed Jun. 2, 2008, 13 pages.
International Search Report and Written Opinion for PCT/US2009/060151 mailed Dec. 17, 2009, 14 pages.
International Search Report and Written Opinion for PCT/US2009/031099 mailed Apr. 1, 2009, 15 pages.
International Search Report and Written Opinion for PCT/US 09/04087 mailed Aug. 27, 2009, 10 pages.
International Search Report and Written Opinion for PCT/US2009/004566 mailed Feb. 1, 2010, 19 pages.
Examination Report for European patent application 07867312.6 mailed Sep. 16, 2013, 6 pages.
Examination Report for European patent application 07867314.2 mailed Sep. 16, 2013, 5 pages.
Second Office Action for Chinese patent application 200980139124.5 mailed Sep. 12, 2013, 7 pages.
Non-final Office Action for U.S. Appl. No. 13/363,808 mailed Sep. 8, 2014, 33 pages.
Non-final Office Action for U.S. Appl. No. 13/363,851 mailed Sep. 5, 2014, 19 pages.
Non-final Office Action for U.S. Appl. No. 13/363,890 mailed Aug. 20, 2014, 25 pages.
International Search Report and Written Opinion for PCT/US2014/026101 mailed Jul. 10, 2014, 9 pages.
Japanese Office Action for patent application 2009-541316 mailed Jan. 10, 2012, 10 pages.
Examination Report for European patent application 09740228.3-2415 mailed Mar. 13, 2012, 12 pages.
Examination Report for European patent application 09701815.4 mailed Apr. 3, 2012, 4 pages.
Examination Report for European patent application 07853287.6 mailed May 15, 2012, 10 pages.
Examination Report for European Patent application 09789099.0 mailed Jun. 14, 2012, 7 pages.
Office Action for Chinese patent application 200780050180.2 mailed Jul. 20, 2012, 8 pages.
Wilson, Brian et al., "Multiwavelength Optical Networking Management and Control," Journal of Lightwave Technology, IEEE Dec. 1, 2000, vol. 18, No. 12, pp. 2038-2057.
International Search Report and Written Opinion for PCT/US2013/063694 mailed May 28, 2014, 10 pages.
First Chinese Office Action for patent application 200780050113 mailed Jul. 26, 2011, 5 pages.
Non-final Office Action for U.S. Appl. No. 11/638,894 mailed Jun. 2, 2009, 4 pages.
Notice of Allowance for U.S. Appl. No. 11/638,894 mailed Dec. 2, 2009, 5 pages.
Second Chinese of Office Action for patent application 200780050113 mailed Jun. 5, 2012, 5 pages.
International Search Report and Written Opinion for PCT/US2013/023971 mailed May 2, 2013, 9 pages.
International Search Report and Written Opinion for PCT/US2013/023975 mailed May 2, 2013, 9 pages.
International Search Report and Written Opinion for PCT/US2013/023977 mailed May 2, 2013, 9 pages.
Final Office Action for U.S. Appl. No. 13/588,079 mailed Nov. 7, 2013, 16 pages.
Third Office Action for Chinese patent application 200980105750.2 mailed Nov. 14, 2013, 8 pages.
Second Office Action for Chinese patent application 200980131993.3 mailed Oct. 12, 2013, 13 pages.
Non-final Office Action for U.S. Appl. No. 13/837,074 mailed Nov. 10, 2014, 25 pages.
Final Office Action for U.S. Appl. No. 13/363,808 mailed Feb. 20, 2015, 37 pages.
Final Office Action for U.S. Appl. No. 13/363,851 mailed Feb. 20, 2015, 22 pages.
Final Office Action for U.S. Appl. No. 13/363,890 mailed Feb. 24, 2015, 26 pages.
Written Opinion for PCT/US2014/026101 mailed Feb. 16, 2015, 4 pages.

(56) References Cited

OTHER PUBLICATIONS

Final Office Action for U.S. Appl. No. 13/837,074 mailed Dec. 14, 2015, 29 pages.
Advisory Action for U.S. Appl. No. 13/837,074 mailed Feb. 12, 2016, 3 pages.
Advisory Action for U.S. Appl. No. 13/837,074 mailed Aug. 14, 2015, 3 pages.
Advisory Action for U.S. Appl. No. 13/837,074 mailed Sep. 21, 2015, 3 pages.
Non-final Office Action for U.S. Appl. No. 13/363,808 mailed Oct. 6, 2015, 36 pages.
Non-final Office Action for U.S. Appl. No. 13/363,890 mailed Oct. 29, 2015, 27 pages.
Non-final Office Action for U.S. Appl. No. 13/363,851 mailed Oct. 6, 2015, 21 pages.
Final Office Action for U.S. Appl. No. 13/837,074 mailed Jun. 5, 2015, 26 pages.
Advisory Action for U.S. Appl. No. 13/363,808 mailed Jun. 10, 2015, 3 pages.
International Preliminary Report on Patentability for PCT/US2013/063694 mailed Apr. 16, 2015, 8 pages.
International Preliminary Report on Patentability for PCT/US2014/026101 mailed May 22, 2015, 6 pages.
Non-final Office Action for U.S. Appl. No. 13/837,074 mailed Apr. 21, 2016, 30 pages.
Final Office Action for U.S. Appl. No. 13/363,808 mailed Apr. 14, 2016, 39 pages.
Final Office Action for U.S. Appl. No. 13/363,890 mailed Apr. 18, 2016, 29 pages.
Final Office Action for U.S. Appl. No. 13/363,851 mailed Apr. 14, 2016, 25 pages.
Examination Report for European Patent Application No. 14723547.7, mailed Sep. 27, 2016, 9 pages.
Notice of Grounds for Rejection for Japanese Patent Application No. 2014-555682, issued Sep. 6, 2016, 6 pages.
Notice of Grounds for Rejection for Japanese Patent Application No. 2014-555685, issued Aug. 30, 2016, 7 pages.
Notice of Grounds for Rejection for Japanese Patent Application No. 2014-555686, issued Aug. 16, 2016, 7 pages.
Final Office Action for U.S. Appl. No. 13/837,074, mailed Sep. 8, 2016, 30 pages.
Notice of Allowance and Examiner-Initiated Interview Summary for U.S. Appl. No. 13/363,808, mailed Aug. 26, 2016, 10 pages.
Notice of Allowance and Examiner-Initiated Interview Summary for U.S. Appl. No. 13/363,890, mailed Aug. 24, 2016, 10 pages.
Notice of Allowance and Examiner-Initiated Interview Summary for U.S. Appl. No. 13/363,851, mailed Aug. 25, 2016, 11 pages.

\* cited by examiner

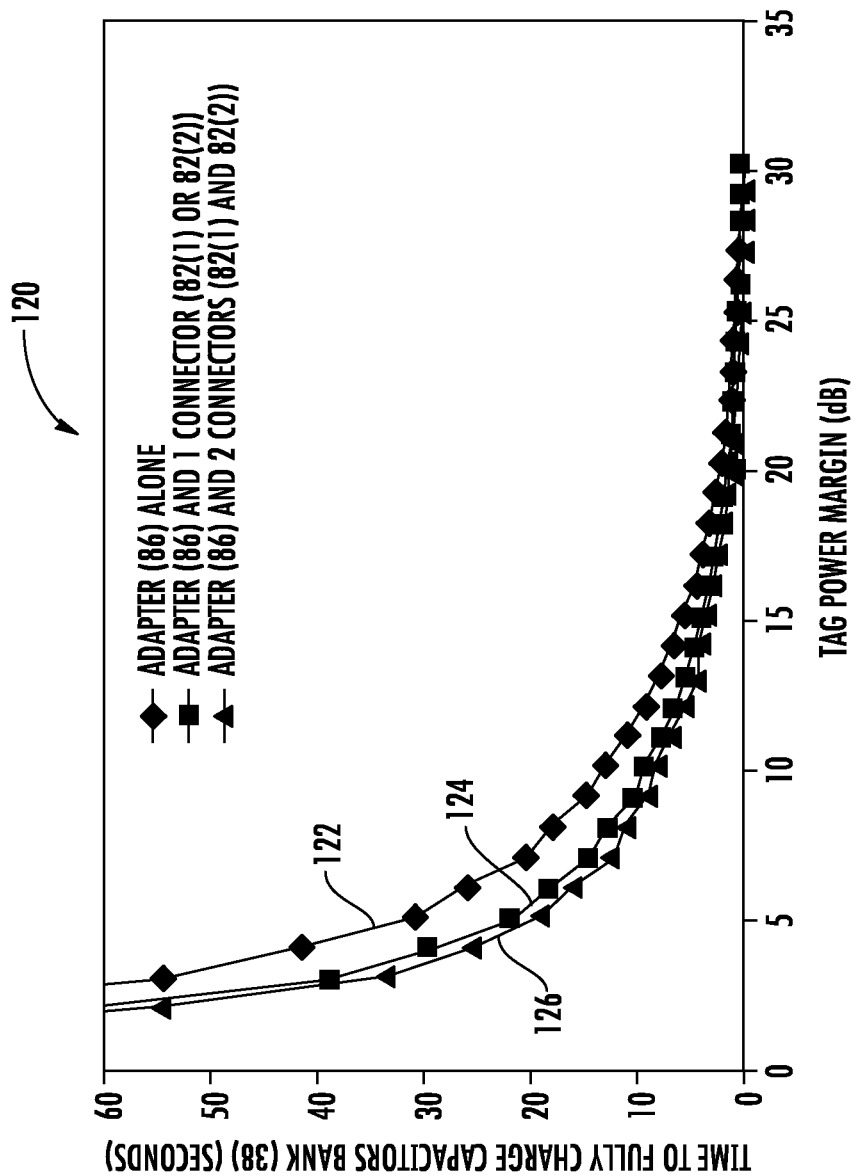

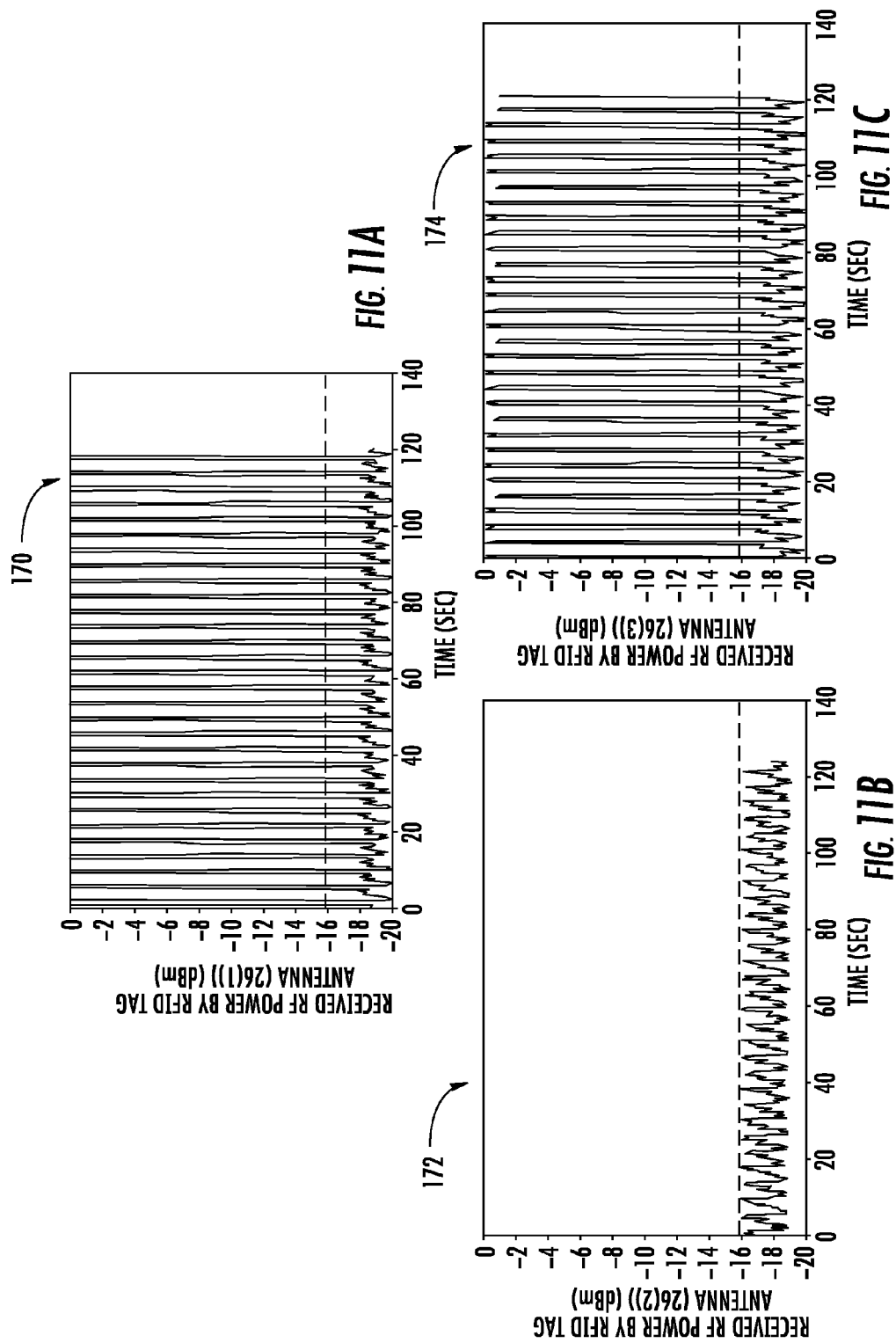

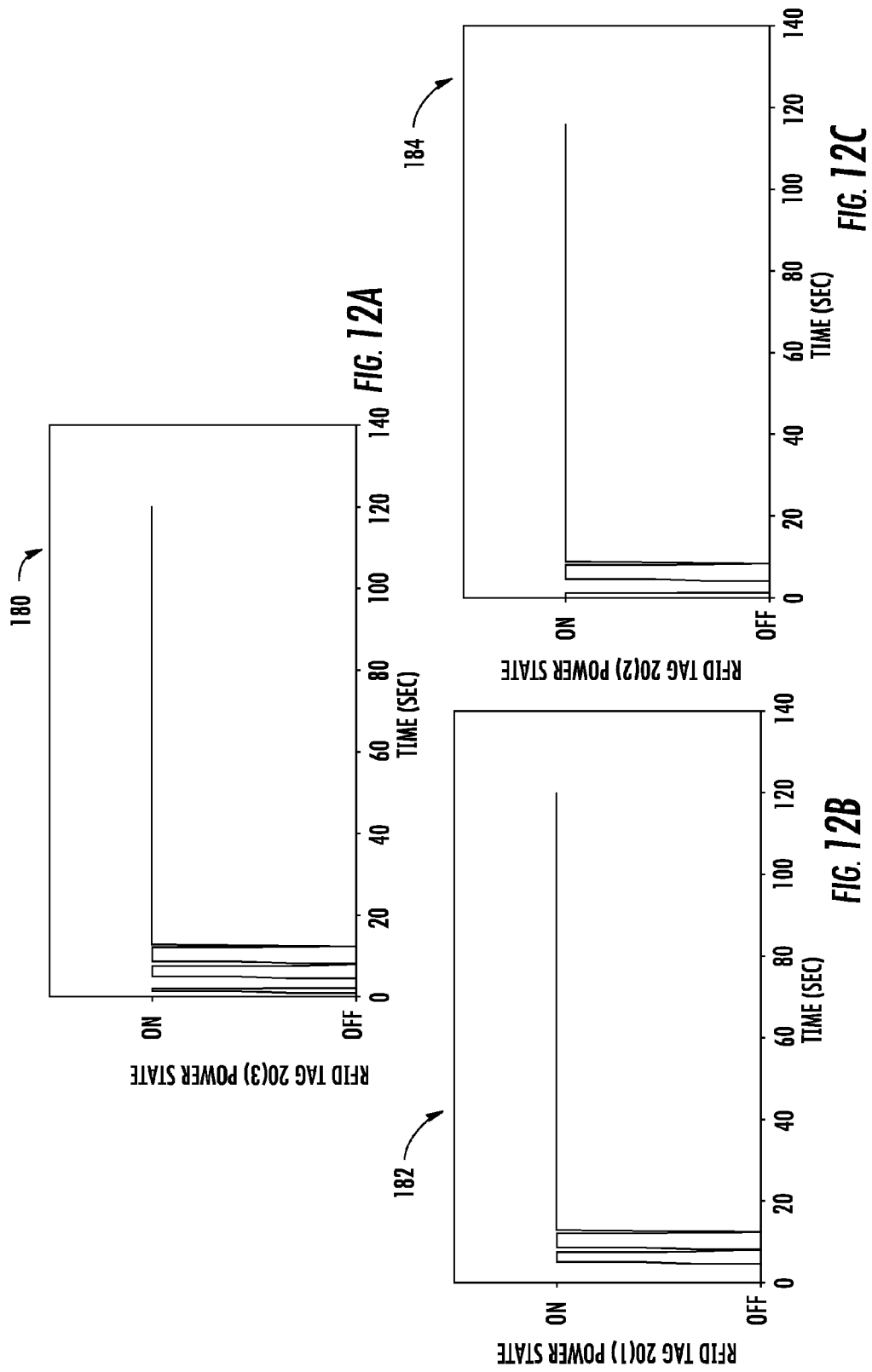

EXCESS RADIO-FREQUENCY (RF) POWER STORAGE AND POWER SHARING RF IDENTIFICATION (RFID) TAGS, AND RELATED CONNECTION SYSTEMS AND METHODS

This application claims benefit of priority under 35 U.S.C. §119 of U.S. Provisional Application Ser. No. 61/710,843 filed on Oct. 8, 2012 the content of which is relied upon and incorporated herein by reference in its entirety.

RELATED APPLICATIONS

The present application is also related to U.S. patent application Ser. No. 13/363,808 filed on Feb. 1, 2012 and entitled "Radio Frequency Identification (RFID) Connected Tag Communications Protocol and Related Systems and Methods," which is a continuation-in-part application of U.S. patent application Ser. No. 12/415,343, filed on Mar. 31, 2009, and entitled "Components, Systems, and Methods for Associating Sensor Data With Component Location," both of which are incorporated herein by reference in their entireties.

The present application is also related to U.S. patent application Ser. No. 13/363,851 filed on Feb. 1, 2012 and entitled "Protocol for Communications Between a Radio Frequency Identification (RFID) Tag and a Connected Device, and Related Systems and Methods," which is a continuation-in-part application of U.S. patent application Ser. No. 12/415,343, filed on Mar. 31, 2009, and entitled "Components, Systems, and Methods for Associating Sensor Data With Component Location," both of which are incorporated herein by reference in their entireties.

The present application is also related to U.S. patent application Ser. No. 13/363,890 filed on Feb. 1, 2012 and entitled "Communications Between Multiple Radio Frequency Identification (RFID) Connected Tags and One or More Devices, and Related Systems and Methods," which is a continuation-in-part application of U.S. patent application Ser. No. 12/415,343, filed on Mar. 31, 2009, and entitled "Components, Systems, and Methods for Associating Sensor Data With Component Location," both of which incorporated herein by reference in their entireties.

The present application is also related to U.S. patent application Ser. No. 13/418,752, filed on Mar. 13, 2012 and entitled "Radio Frequency Identification (RFID) in Communication Connections, Including Fiber Optic Components," which is incorporated herein by reference in its entirety.

The present application is also related to U.S. patent application Ser. No. 11/590,377, filed on Oct. 31, 2006 and entitled "Radio Frequency Identification Transponder For Communicating Condition Of A Component," which is incorporated herein by reference in its entirety.

BACKGROUND

Field of the Disclosure

The field of the disclosure relates to radio-frequency (RF) identification (RFID) tags, also referred to as transponders, and particularly to powering RFID tags from RF field energy.

Technical Background

It is well known to employ radio frequency (RF) identification (RFID) transponders to identify articles of manufacture. RFID transponders are often referred to as "RFID tags." For example, a RFID system could be provided that includes one or more RFID tags. The RFID tags may include RF circuitry in the form of an integrated circuit (IC) chip that is communicatively coupled to an antenna. The IC chip may also be coupled to memory. An identification number or other characteristic is stored in the IC chip or memory coupled to the IC chip. The identification number can be provided to another system, such as the RFID reader, to provide identification information for a variety of purposes.

If the RFID tag is an "active" tag having a transmitter, the RFID tag can transmit the identification information to a RFID reader using power stored in the RFID tag. Thus, an active RFID tag contains its own power source, which is typically a battery, for powering an RF transmitter. In contrast, if the RFID tag is a "passive" tag, the RFID tag does not contain its own power source. Power to operate a passive RFID tag is received through energy contained in a wireless RF signal received by the RFID tag antenna. The wireless RF signal is transmitted by a transmitter in the RFID reader. A passive RFID tag harvests energy from the electro-magnetic field of the wireless RF signal to provide power to the IC for a passive RFID tag operation and for communications with the RFID reader. A passive RFID tag can respond to receipt of the wireless RF signal from an RFID reader, including by providing identification information stored in the passive RFID tag, such as via backscatter modulation communications, as an example. In either case of a passive or active RFID tag, the RFID reader may store information received from the RFID tag in a database and/or report the information to other systems outside the RFID system.

It may be desirable to provide a RFID system that can detect events for a plurality of RFID tags. It may be desired to detect these RFID tag events as they occur. In this example, the RFID tags may be equipped with event detection capability. For example, events may include connection of the RFID tag to another electrical component, connection of a connector housing the RFID tag to another connection, or activating a switch associated with the RFID tag, as non-limiting examples. Events may also include detecting environmental conditions, including but not limited to temperature, pressure, humidity, or light exposures, as non-limiting examples. Some conditions, including environmental conditions, may require the RFID tags to be equipped with a condition event sensor capable of detecting the condition. A RFID reader provided in the RFID system may communicate with the entire RFID tag population to determine which RFID tags detected an event and the type of event that occurred.

An important limitation of passive RFID tag technology is that when insufficient RF power is available from a reader, the RFID tag will be inactive. This is illustrated by example in FIG. 1. FIG. 1 is a graph 10 illustrating RF power 12 received from a RFID reader by a RFID tag antenna of a RFID tag connection in decibels per meter (dBm) as a function of time (in seconds). A nominal threshold power is required to be received by the RFID tag antenna to turn on the RFID tag for operation. This is shown by power level line 14 in FIG. 1 and is assumed to be −16 dBm. In FIG. 1, an RFID tag is experiencing received power fluctuations, because the RFID reader switches its signal among four different RFID reader antennas, with equal time devoted to each RFID reader antenna. The RFID reader changes RFID reader antennas about once per second. The four different levels of RF power received by the RFID tag antenna are illustrated in FIG. 1 by power level 16A (about −5 dBm), power level 16B (about −10 dBm), power level 16C (about −18 dBm) and power level 16D (about −20 dBm), respectively, for the four RFID reader antennas. These different power levels occur because the RFID tag is located a different distance from each of the four RFID reader antennas.

However, as shown in FIG. 1, the RF power 12 received by the RFID tag antenna from the RFID reader may not always be at or above the nominal threshold power level 14. As illustrated in FIG. 1, the received RF power 12 is below the nominal threshold power level 14 about one half of the time. This is also referred to as negative power margin for the RFID tag. As also illustrated in FIG. 1, the RF power 12 received by the RFID tag antenna from the RFID reader is above the nominal threshold power level 14 about one half of the time. This is also referred to as positive power margin for the RFID tag. Two of the received RF power levels 16C, 16D are below the nominal threshold power level 14 for operation of the RFID tag and experience negative power margin. Two of the received RF power levels 16A, 16B are above the nominal threshold power level 14 for operation of the RFID tag and experience positive power margin. The RFID tag will turn on and off as RFID tag experiences positive and negative power margin. This negative power margin experienced at times by a RFID tag can be a problem in various situations.

As one non-limiting example, negative power margin in a RFID tag can occur when the RFID tag is shadowed by objects or other RFID tags. Negative power margin can also occur when metal is in close proximity to the RFID tag causing an impedance mismatch between the RFID tag and its RFID tag antenna. Negative power margin can also occur when reflections of the RF field of wireless RF signals cause interference or a null in the region of the RFID tag. Negative power margin can also occur if a RFID reader transmits wireless RF signals at a frequency for which the RFID tag antenna of the RFID tag is unresponsive. Negative power margin can also occur due to a RFID reader switching between different RFID reader antennas. Negative power margin can also occur when a RFID reader switches to a RFID reader antenna that is located too far (i.e. out of range) from the RFID tag to provide sufficient RF power to the RFID tag. All of these exemplary conditions, and others, can lead to periods of time during which the RFID tag does not harvest enough RF power from the wireless RF signals to power the RFID tag, thus rendering the RFID tag inoperable.

SUMMARY OF THE DETAILED DESCRIPTION

Embodiments disclosed herein include excess radio-frequency (RF) power storage and power sharing RFID tags. Related RFID tag connection systems and methods are also disclosed herein. The excess RF power storage and power sharing RFID tags and related RF Identification (RFID) tag connection systems and methods in embodiments disclosed herein allow connected RFID tags to store excess energy derived from excess received RF power in a shared energy storage device. In this manner, an individual RFID tag or a group of connected RFID tags in the RFID tag connection system can continue operation during temporary times when sufficient RF power is not being received from a RFID reader. Sharing stored energy derived from excess received RF power in a shared energy storage device among connected RFID tags in a RFID tag connection system can significantly mitigate problems of RF power interruption.

In this regard in one embodiment, a RFID tag connection system is provided. The RFID tag connection system comprises a first RFID tag. The first RFID tag comprises at least one first antenna configured to receive first RF power in received first wireless RF signals, a first energy storage device configured to store excess energy derived from excess received first RF power, and one or more first energy sharing conductors coupled to the first energy storage device. The RFID tag connection system also comprises a second RFID tag. The second RFID tag comprises at least one second antenna configured to receive second RF power in received second wireless RF signals, and one or more second energy sharing conductors. The first energy storage device forms a shared energy storage device when the one or more first energy sharing conductors of the first RFID tag are connected to one or more second energy sharing conductors of the second RFID tag. The first RFID tag also comprises a first power manager configured to store excess energy derived from the excess received first RF power in the shared energy storage device if the received first RF power exceeds a first operational threshold power for the first RFID tag. The second RFID tag also comprises a second power manager configured to store excess energy derived from excess received second RF power in the shared energy storage device if the received second RF power exceeds a second operational threshold power for the second RFID tag. In this manner, RF power may be effectively shared between connected RFID tags. One or more of the connected RFID tags may store excess received RF energy in the shared energy storage device, while another connected RFID tag or RFID tags may access RF power from the shared energy storage device when not receiving wireless RF signals or sufficient RF power in received wireless RF signals sufficient for operation.

In another embodiment, a method of sharing stored excess RF power storage between RFID tags is provided. The method comprises receiving first RF power in first wireless RF signals received by a first RFID tag comprising one or more first energy sharing conductors coupled to a first energy storage device. The method also comprises receiving second RF power in second wireless RF signals received by a second RFID tag comprising one or more second energy sharing conductors. The method also comprises connecting the one or more first energy sharing conductors of the first RFID tag to the one or more second energy sharing conductors of the second RFID tag to form at least a portion of a shared energy storage device from the first energy storage device. The method also comprises storing excess energy derived from excess received first RF power in the shared energy storage device if the received first RF power exceeds a first operational threshold power for the first RFID tag. The method also comprises storing excess energy derived from excess received second RF power in the shared energy storage device if the received second RF power exceeds a second operational threshold power for the second RFID tag.

Embodiments disclosed herein also include excess RF power storage in RFID tags and related methods. The RFID tag is configured to be powered from received RF power in wireless RF signals if the received RF power meets or exceeds an operational threshold power for the RFID tag. The RFID tag is also further configured to store excess energy derived from excess RF power in an energy storage device if the received RF power exceeds the operational threshold power for the RFID tag. In this manner, when the received RF power from the RFID tag antenna does not contain sufficient power to operate the RFID tag, the RFID tag can operate from power provided by previously stored excess energy in the energy storage device.

The above-described aspects and features can provide improved system performance of an RFID reader and one or more RFID tags (particularly multiple RFID tags joined together) in terms of tag readability and operability. Particularly in an application that relies on continuous tag operability (even for a limited time, such as in the presence of a RFID reader, for example), and in which system degradation occurs whenever a RFID tag is not powered and operating, it is desired or may be required that all RFID tags maintain continuous power delivery to operate the RFID tag. The features of this disclosure, individually or in combination, can maximize the probability that any given RFID tag can maintain continuous operation by allowing excess harvested reader RF power during some periods to be available as stored energy to power the respective RFID tag during periods of insufficient reader RF power harvesting from a wireless RF signal from a RFID reader.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the embodiments. The accompanying drawings are included to provide a further understanding of the embodiments, and are incorporated into and constitute a part of this specification. The drawings illustrate various embodiments of the embodiments and together with the description serve to explain the principles and operation of the embodiments.

BRIEF DESCRIPTION OF THE FIGURES

FIG. 8A is a graph illustrating exemplary times to fully charge capacitor banks in the shared energy storage device in the RFID tag connection system in FIGS. 5 and 6 at start-up as a function of RFID tag power margin, for certain connection combinations of the RFID tags, when a charge pump is employed in the RFID tags;

FIGS. 11A-11C are graphs illustrating exemplary received RF power by RFID tag antennas of three exemplary electrically connected RFID tags as a function of time in the RF power storage and power sharing in the RFID tag connection system of FIGS. 5 and 6;

FIGS. 12A-12C are graphs illustrating exemplary on/off states of three exemplary electrically connected RFID tags as a function of time when the excess RF power storage and power sharing in the RFID tag connection system of FIGS. 5 and 6 is employed;

DETAILED DESCRIPTION

Reference will now be made in detail to the embodiments, examples of which are illustrated in the accompanying drawings, in which some, but not all embodiments are shown. Indeed, the embodiments may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include excess radio-frequency (RF) power storage and power sharing RF Identification (RFID) tags. Related RFID tag connection systems and methods are also disclosed herein. The excess RF power storage and power sharing RFID tags and related RFID tag connection systems and methods in embodiments disclosed herein allow connected RFID tags to store excess energy derived from excess received RF power in a shared energy storage device. In this manner, an individual RFID tag or a group of connected RFID tags in the RFID tag connection system can continue operation during temporary times when sufficient RF power is not being received from a RFID reader. Sharing stored energy derived from excess received RF power in a shared energy storage device among connected RFID tags in a RFID tag connection system can significantly mitigate problems of RF power interruption.

Embodiments disclosed herein also include excess RF power storage in RFID tags and related methods. The RFID tag is configured to be powered from received RF power in wireless RF signals if the received RF power meets or exceeds an operational threshold power for the RFID tag. The RFID tag is also further configured to store excess energy derived from excess RF power in an energy storage device if the received RF power exceeds the operational threshold power for the RFID tag. In this manner, when the received RF power from the RFID tag antenna does not contain sufficient power to operate the RFID tag, the RFID tag can operate from power provided by previously stored excess energy in the energy storage device.

Figure 1:
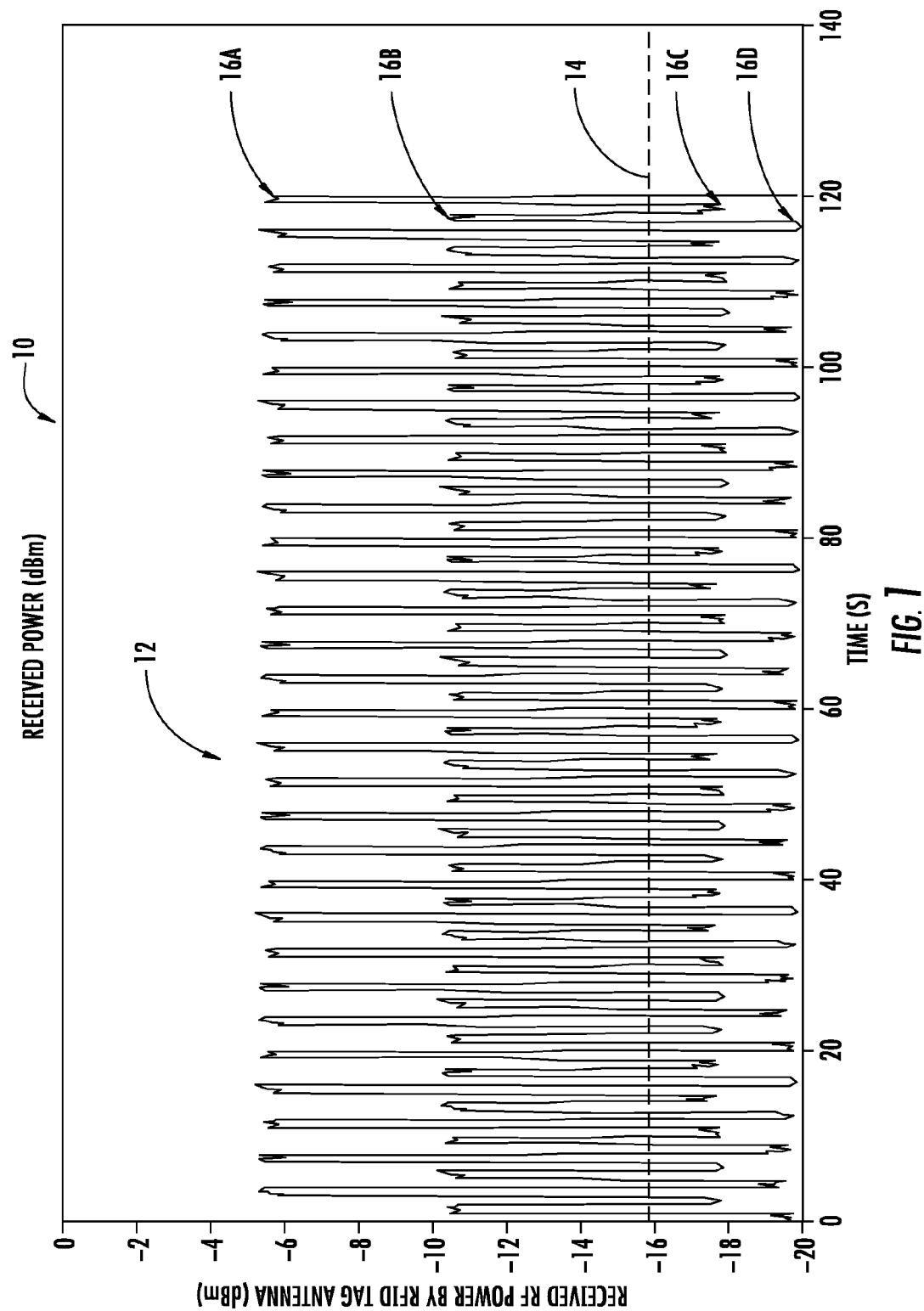
FIG. 1 is a graph illustrating exemplary received RF power from a RFID reader by a RFID tag antenna of an exemplary RFID tag as a function of time.
Figure 2:
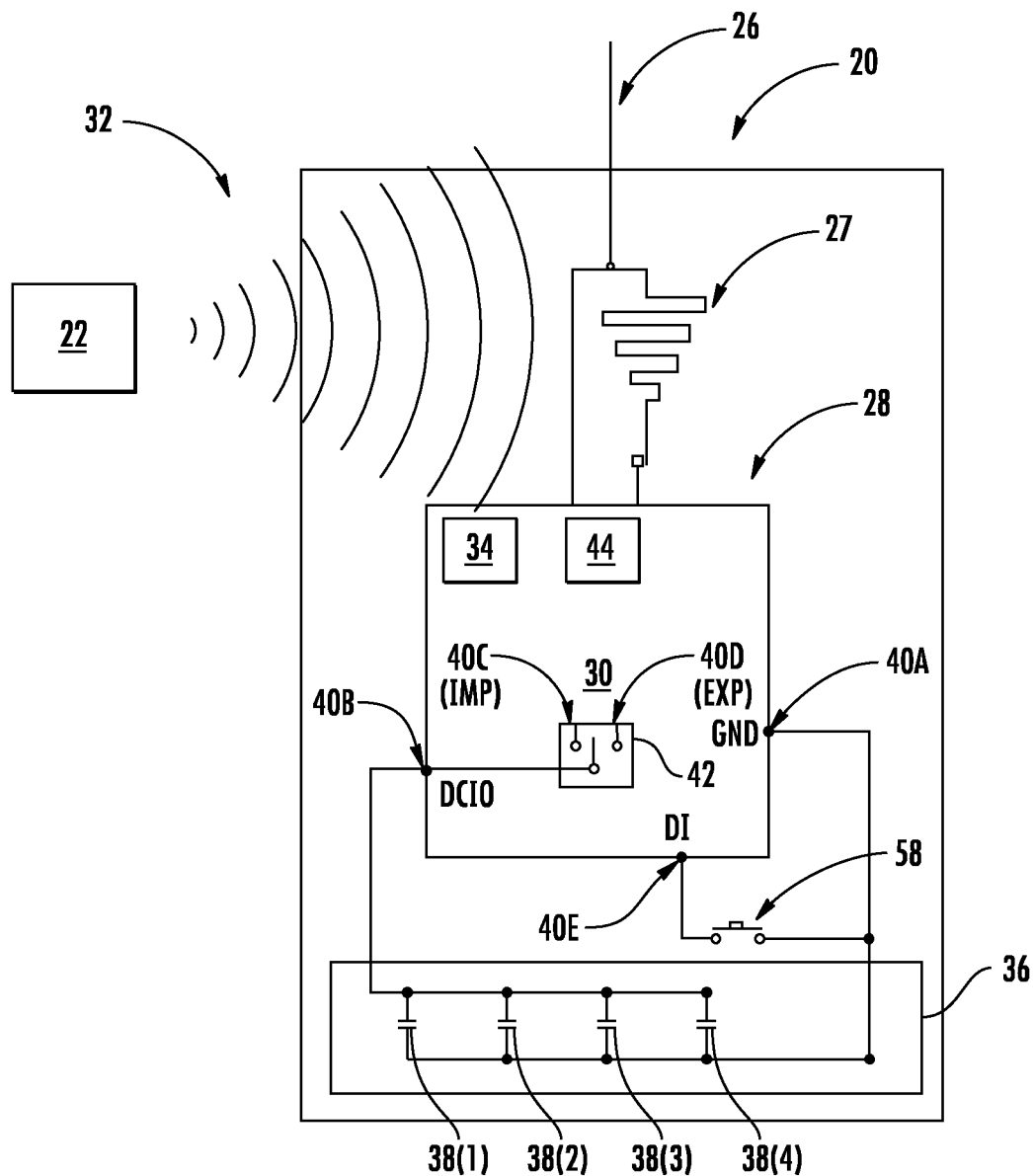
FIG. 2 is a schematic diagram illustrating an exemplary RFID tag configured to store excess energy derived from excess received RF power in an energy storage device when the RFID tag experiences positive power margin, and access stored energy in the energy storage device to provide power to operate the RFID tag when the RFID tag experiences negative power margin.

In this regard, FIG. 2 is a schematic diagram illustrating an exemplary RFID tag 20 configured to store excess energy derived from excess received RF power from a RFID reader 22 in an energy storage device 36 when the RFID tag 20 experiences positive power margin. As will also be discussed below, the RFID tag 20 in FIG. 2 is also configured to access stored energy in the energy storage device 36 to provide power to operate the RFID tag 20 when the RFID tag 20 experiences negative power margin. The RFID tag 20 may be a passive RFID tag, semi-active RFID tag, or active RFID tag. However, the excess RF power storage and energy access features of the RFID tag 20 may be particularly useful for passive RFID tags that require external RF power to be received by a RFID tag antenna 26 (or "antenna 26") of the RFID tag 20. The RFID tag antenna 26 in FIG. 2 is a monopole antenna. However, the RFID tag antenna 26 can be any type of antenna desired, including but not limited to a monopole antenna, a dipole antenna, a slot antenna, and a loop antenna. An optional matching network 27 may also be included to provide impedance matching between the RFID tag antenna 26 and the RFID tag 20, if needed or desired.

Positive power margin (i.e., excess power) for the RFID tag 20 is a function of the output power of the wireless RF signals received by the RFID tag 20 from the RFID reader 22 minus the RF power required to turn on the RFID IC 28. For example, the Federal Communications Commission (FCC) limits output power delivered to a RFID reader antenna to thirty (30) dBm (for antenna gain<6 dBi), or 1 Watt (W). There will be losses present between the RFID reader 22 antenna and the RFID tag antenna 26 that govern the level of RF power reaching the RFID tag 20. Experimentally, the power margin of a RFID tag in a given system is measured by gradually increasing the RFID reader output power and determining the minimum output power at which the RFID tag first turns on and is able to communicate with the RFID reader. For example, consider the RFID tag 20 that is first detected by the RFID reader 22 when the RFID reader 22 output power is at 17 dBm during a power margin measurement. In this example, the power margin of the RFID tag 20 would be 13 dB (30 dB-17 dB). This means the RFID tag 20 would experience an RF field strength 13 dB higher than required for operation in this example, which is positive power margin.

With continuing reference to FIG. 2, the RFID tag antenna 26 of the RFID tag 20 is electrically coupled to a RFID integrated circuit (IC) 28 (or "IC 28"). For example, the RFID IC 28 may be provided in the form of an RFID IC chip 30. The RFID IC 28 contains circuitry for operation of the RFID tag 20, including receiver circuitry configured to receive wireless RF signal 32 transmitted by the RFID reader 22. The wireless RF signals 32 are received by the RFID tag antenna 26 if the RFID tag antenna 26 is in transmission range of the RFID reader 22 and the RFID tag antenna 26 is configured to receive a signal frequency or signal frequencies of the wireless RF signals 32. The RFID IC 28 may also contain memory 34 that can be used to store information relating to the RFID tag 20, such as identification information or other information desired. This information can be communicated by the RFID tag 20 to the RFID reader 22 for any use or purpose desired. The RFID IC 28 may also be configured to store other information in memory 34 and communicate this information associated with the RFID tag 20 or components associated with the RFID tag 20.

The RFID tag 20 in FIG. 2 requires a certain amount of power to turn on the RFID IC 28. In this regard, the RFID tag 20 is configured to use RF power contained in the wireless RF signals 32 received by the RFID tag antenna 26 of the RFID tag 20 for operational power. The RF power can be provided to the RFID IC 28 to provide power for RFID tag 20 operation. If the RFID tag 20 is a passive RFID tag, the RF power received in the wireless RF signals 32 is the only form of external power provided to the RFID tag 20 for operation. In this example, power for RFID tag 20 operation must be at or above an operational threshold power for the RFID IC 28. The RFID IC 28 may also require a defined minimum threshold voltage to be turned on for operation. As an example, the minimum threshold voltage to turn on the RFID IC 28 may be 1.0 Volt (V) as a non-limiting example. When RF power from the received wireless RF signals 32 is sufficient to meet or exceed the operational threshold power for the RFID IC 28, the RFID tag 20 is operational. However, if the RF power from the received wireless RF signals 32 does not meet or exceed the operational threshold power for the RFID IC 28, the RFID IC 28 cannot be turned on for RFID tag 20 operation unless another power source is provided.

In this regard as illustrated in FIG. 2, the energy storage device 36 is provided in the RFID tag 20. The capacitor bank 38 of the energy storage device 36 is configured to store excess energy derived from received RF power from the received wireless RF signals 32 in excess of RF power consumed to turn on and operate the RFID IC 28. This excess energy that can be stored in the energy storage device 36 of the RFID tag 20 during positive power margin conditions is also referred to herein as "excess received RF power." If the RFID tag 20 is a semi-active RFID tag that contains a battery for operation, the energy storage device 36 could be or include a battery of semi-passive RFID tag, which could be charged (e.g., trickle charged) from the excess received RF power. The RF power needed to turn on and operate the RFID tag 20 is known as the operational threshold power for the RFID tag 20. Thus, when wireless RF signals 32 are not being received by the RFID tag 20 or the RF power in the received wireless RF signals 32 is not sufficient to turn on and operate the RFID IC 28, a "negative power margin" condition exists in the RFID tag 20. In this scenario, stored energy previously stored in the capacitor bank 38 during positive power margin conditions of the RFID tag 20 can be accessed to provide power to turn on and/or maintain an existing operational state of the RFID tag 20.

With continuing reference to FIG. 2, the energy storage device 36 may be or include a capacitor bank 38. The capacitor bank 38 can include one or more capacitors. The capacitor bank 38 in this example in FIG. 2 includes four capacitors 38(1)-38(4), each of 4.7 microFarads (μF), which are provided and connected in parallel to form the capacitor bank 38. In this embodiment, the capacitor bank 38 is electrically connected on one side to ground node 40A and on the other side to DC input/output (DCIO) power node 40B which is connected to power import/export switch 42. Thus, when wireless RF signals 32 are being received by the RFID tag 20 with sufficient power to turn on the RFID tag 20 and excess power exists, a "positive power margin" condition exists in the RFID tag 20. In this scenario, the power import/export switch 42 connects the capacitor bank 38 to export node (EXP) 40D to store the excess energy derived from the received excess RF power in the capacitor bank 38. However, when wireless RF signals 32 are not being received by the RFID tag 20, or the RF power in the received wireless RF signals 32 is not sufficient to turn on and operate the RFID tag 20, a "negative power margin" condition exists in the RFID tag 20. In this scenario, the energy previously stored in the capacitor bank 38 during positive power margin conditions can be accessed to provide power to turn on and/or maintain an existing operational state of the RFID tag 20 when power import/export switch 42 is set to connect the capacitor bank 38 to import node (IMP) 40C. In this regard, the power import/export switch 42 may a single pole, double throw switch to switch between import node 40C and export node 40D, as a non-limiting example.

Note that in FIG. 2 as discussed above, multiple capacitors 38(1)-38(4) are provided and disposed in parallel to each other in the capacitor bank 38. There may be several reasons to provide multiple capacitors in a capacitor bank 38. A single capacitor of desired capacitance may not be available. Also, it may be more feasible to provide several smaller capacitors to form a total desired capacitance of the capacitance bank 38 due to packaging or other geometric limits or considerations. Also, it may be desired to provide multiple capacitors coupled in parallel to provide the total capacitance of a given capacitor bank 38 for redundancy purposes. In this manner, if any capacitor 38(1)-38(4) in the capacitor bank 38 fails to open, the other capacitors 38(1)-38(4) may still be operational in the energy storage device 36 to store excess energy during positive power margin conditions and provide access to stored energy during negative power margin conditions.

The ability of the RFID tag 20 in FIG. 2 to turn on and/or maintain operability during negative power margin conditions can be important depending on the application employing the RFID tag 20. For example, the RFID tag 20 can be shadowed by objects or other RFID tags causing the RFID tag 20 to not receive the wireless RF signal 32 or wireless RF signals 32 containing insufficient RF power for RFID tag 20 operation. As another example, metal in close proximity to the RFD tag 20 could cause an impedance mismatch between the RFID tag 20 and its RFID tag antenna 26, thereby reducing RF power received by the RFID tag antenna 26. Negative power margin conditions can also occur due to reflections of a RF field, which can cause interference or a signal reception null in the region of the RFID tag 20. Negative power margin conditions can also occur if the RFID reader 22 transmits the wireless RF signals 32 at a frequency for which the RFID tag antenna 26 is unresponsive. Negative power margin conditions can also occur due to a RFID reader switching between different RFID reader antennas. Negative power margin conditions can also occur when a RFID reader switches to a RFID reader antenna that is located too far (i.e., out of RF range) from the RFID tag to provide sufficient RF power to the RFID tag. All of these negative power margin conditions can lead to periods of time during which the RFID tag 20 does not harvest enough RF power from the wireless RF signals 32 to sufficiently power the RFID tag 20 for operation.

The RFID IC 28 can be provided with capability of managing RF power during positive and negative power margin conditions. In this regard with continuing reference to FIG. 2, a power manager 44 is provided in the RFID IC 28 in this example of the RFID tag 20. The power manager 44 is circuitry configured to manage power for operation of the RFID tag 20. The power manager 44 receives the RF power contained in the wireless RF signals 32 received by the RFID tag antenna 26 and controls the RF power for operating the RFID tag 20. Note that more than one RFID tag antenna may be provided if desired. The power manager 44 is configured to control the storage of excess energy derived from excess received RF power from the received wireless RF signals 32 in the energy storage device 36 during positive power margin conditions. The power manager 44 is also configured to control the access of energy previously stored in the energy storage device 36 to provide operational power to the RFID tag 20 when sufficient RF power is not available for RFID tag 20 operation in negative power margin conditions. In this regard, FIG. 3 is a flowchart illustrating an exemplary process of the power manager 44 in the RFID tag 20 in FIG. 2 to manage power for the RFID tag 20.

Figure 3:
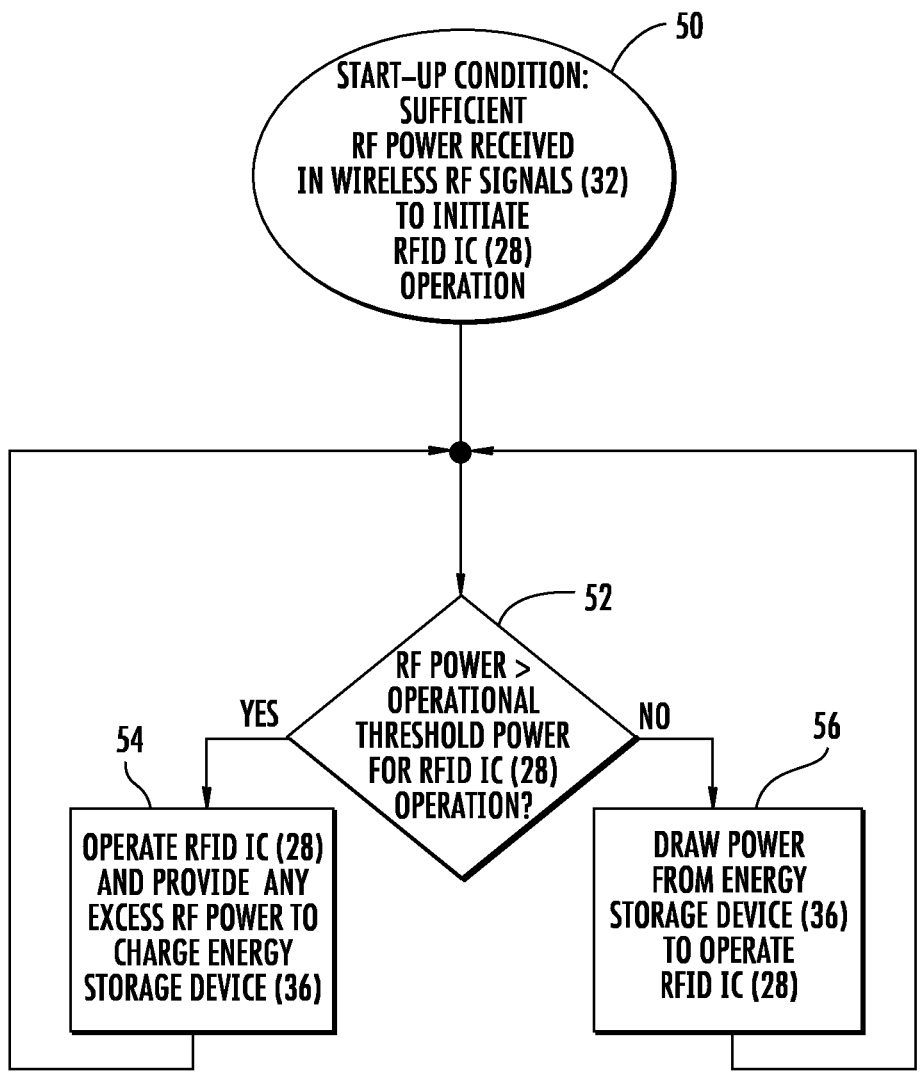
FIG. 3 is a flowchart illustrating an exemplary process of the RFID tag in FIG. 2 storing excess energy derived from excess received RF power in the energy storage device during positive power margin conditions, and accessing stored energy in the energy storage device to provide power to operate the RFID tag when sufficient RF power is not available for RFID tag operation during negative power margin conditions.

In this regard as illustrated in FIG. 3, the process begins in a start-up condition. In the start-up condition, the RFID tag 20 has not been previously powered for operation, or has been inoperable for a period of time after the power remaining in the energy storage device 36 is insufficient to maintain operability of the RFID IC 28. During the start-up condition, the RFID tag antenna 26 of the RFID tag 20 receives RF power in received wireless RF signals 32 sufficient to initiate operation of the RFID tag 20 in a positive power margin condition (block 50). The start-up of the RFID tag 20 can only occur when the RFID tag 20 is in a positive power margin condition, because the RFID tag 20 has to first be operational before the power manager 44 can operate to store excess energy derived from excess received RF power in the energy storage device 36 and access stored energy from the energy storage device 36.

With continuing reference to FIG. 3, after the start-up condition for the RFID tag 20 has occurred (block 50), the power manager 44 in the RFID IC 28 is operational. The power manager 44 determines if the RF power in the received wireless RF signals 32 is sufficient for RFID tag 20 operation, meaning a positive power margin condition exists (block 52). The power manager 44 may be configured to determine if the received RF voltage and/or current in the received wireless RF signals 32 is sufficient for RFID tag 20 operation, meaning a positive power margin condition exists (block 52). For example, as previously discussed above, the power manager 44 can determine if the RF power in the received wireless RF signals 32 meets or exceeds the operational threshold power for the RFID tag 20. The voltage level of the RF power in the received wireless RF signals 32 may be used by the power manager 44 to determine whether the received RF power meets or exceeds the operational threshold of the RFID tag 20, because a minimum voltage may be required to turn on the RFID tag 20.

After RFID tag 20 start-up, the RF power in the received wireless RF signals 32 should initially meet or exceed the operational threshold power for the RFID tag 20. This is because the start-up condition occurs when sufficient power cannot be accessed (i.e., drawn) from the energy storage device 36 for RFID tag 20 operation. In this instance, the power manager 44 operates the RFID IC 28 with the RF power in the received wireless RF signals 32 (block 54). Any excess energy in the received RF power beyond the power needed to operate the RFID IC 28 (i.e., in excess of the operational threshold power for the RFID tag 20) is stored in the energy storage device 36 by the power manager 44 setting power import/export switch 42 in FIG. 2 to connect the energy storage device 36 to export node 40D. The power import/export switch 42 may be provided as part of the RFID IC 28 as shown in FIG. 2, or external to the RFID IC 28. As previously discussed, excess energy derived from excess received RF power and stored in energy storage device 36 during positive power margin conditions can be accessed during negative power margin conditions to allow for continued RFID tag 20 operation.

With continuing reference to FIG. 3, the power manager 44 continues to determine if RFID tag 20 is in a positive power margin condition (block 52). The power manager 44 determines if the RF power in the received wireless RF signals 32 is sufficient for RFID tag 20 operation, meaning a positive power margin condition exists (block 52). If the power manager 44 determines that the RFID tag 20 is in negative power margin condition (block 52), the power manager 44 sets the power import/export switch 42 in FIG. 2 to connect the energy storage device 36 to import node 40C to access stored energy (e.g., current) stored in the energy storage device 36 to provide power for continued RFID tag 20 operation (block 56). The power manager 44 continues to determine if RFID tag 20 is in a positive power margin condition to store excess energy derived from excess received RF power in the energy storage device 36 (block 54); or in a negative power margin condition (block 52) to access stored energy in the energy storage device 36 (block 56) to provide power for continued RFID tag 20 operation. If energy stored in the energy storage device 36 is ever completely drained for RFID tag 20 operation, the RFID tag 20 will become idle in this embodiment. The RFID tag 20 can become operational again as a result of the start-up condition described above wherein RF power from received wireless RF signals 32 is sufficient to operate the RFID tag 20 (block 50).

With reference back to FIG. 2, the RFID tag 20 may also include an optional condition responsive device 58 that is coupled between the GND node 40A and a digital input (DI) node 40E. The condition responsive device 58 may provide an alternative method of accessing stored energy in the energy storage device 36 to provide power to the RFID tag 20. For example, if the condition responsive device 58 is a push button switch, it may be desired to provide the condition responsive device 58 to allow a technician to activate the switch to provide power from stored energy in the energy storage device 36. The stored energy may be used to provide power to turn on the RFID tag 20 and/or any of its components (e.g., the visual indicator described below), when desired by a technician in addition to the power control provided by the power manager 44 for the RFID tag 20. The condition responsive device 58 may also be any other type of switch that can sense a condition about or relating to the RFID tag 20, including environmental, operational, and contact conditions. Non-limiting examples of environmental conditions include temperature, humidity, pressure, light exposure, resistance, inductance, and/or capacitance. Non-limiting examples of operational conditions include the status of the RFID tag 20, and resistance, inductance, and/or capacitance associated with the RFID tag 20. Non-limiting examples of contact conditions include contact of a component, such as a switch, associated with the RFID tag 20, touching the RFID tag 20, and connection of a component associated with the RFID tag 20 to another device or component.

With continuing reference to FIG. 2, the condition responsive device 58 could also be configured to indicate the occurrence of a condition or event to the IC 28. The IC 28 of the RFID tag 20 could be configured to report the occurrence of the detected condition or event by activation of the condition responsive device 58 to the RFID reader 22. For example, the RFID reader 22 may log the condition and/or provide information to the technician in connection with the RFID tag 20, such as a proper connection between a component carrying the RFID tag 20 and another component. Because the energy storage device 36 is provided, the RFID tag 20 can be configured to be powered from the energy storage device 36 to detect and report the occurrence of a detected condition even when the RFID tag antenna 26 is not receiving sufficient RF power to operate the RFID tag 20 and detect and report the occurrence of the detected condition. More information regarding this example is provided in U.S. patent application Ser. No. 11/590,377 entitled "Radio Frequency Identification Transponder For Communicating Condition Of A Component," which is incorporated herein by reference in its entirety.

Figure 4:
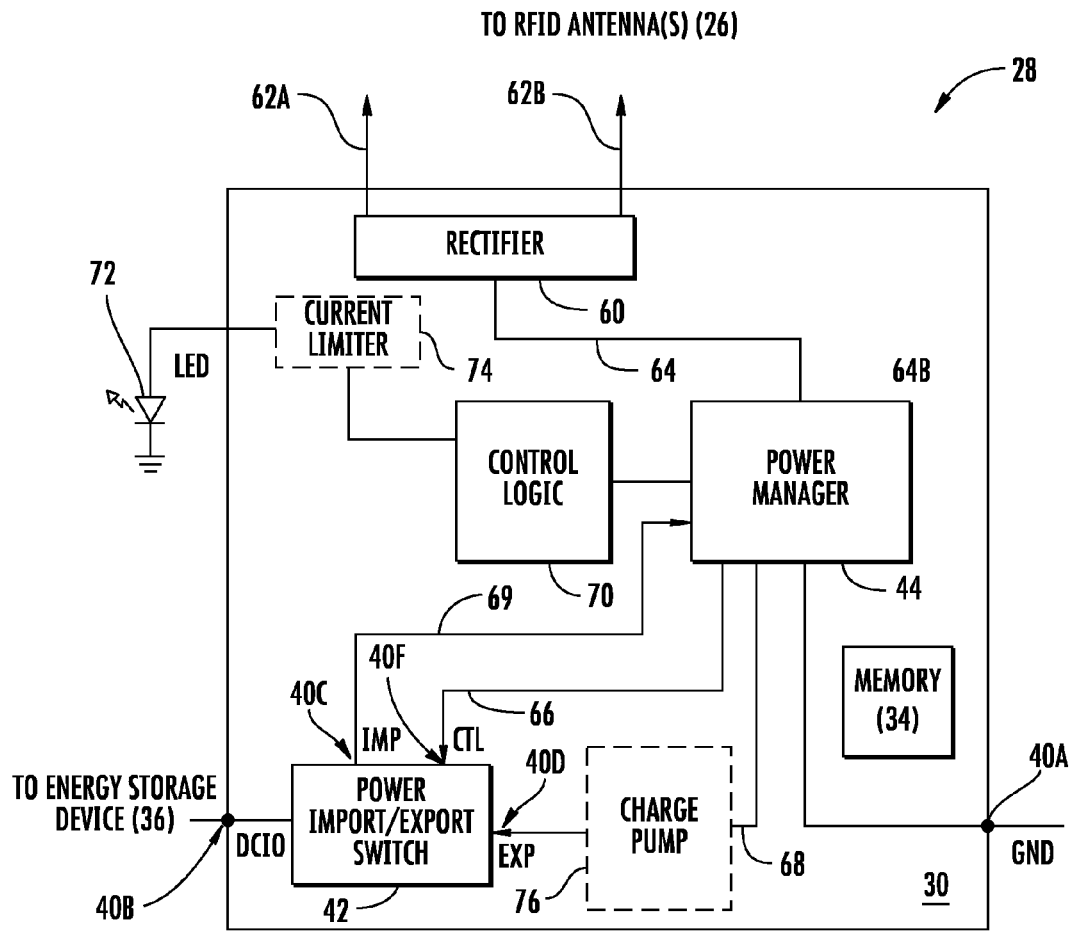
FIG. 4 is a schematic diagram of an exemplary RFID integrated circuit (IC) chip provided in the RFID tag in FIG. 2, wherein exemplary components involved with energy storage derived from excess received RF power and energy sharing provided in the RFID IC chip are illustrated.

To further explain exemplary components that may be provided in the RFID IC 28 of the RFID tag 20 to provide excess RF power storage and the operations in FIG. 3, FIG. 4 is provided. FIG. 4 is a schematic diagram of exemplary internal components of the RFID IC chip 30 provided in the RFID tag 20 in FIG. 2. In this embodiment, the RFID IC chip 30 contains a power rectifier 60 configured to rectify RF power received in the wireless RF signal 32 by the RFID tag antenna 26. The power rectifier 60 is coupled to antenna pins 62A and 62B, which are coupled to the RFID tag antenna 26 shown in FIG. 2. The RF power rectified by the power rectifier 60 is provided over power communications line 64 to the power manager 44. The power manager 44 can be configured to operate the IC 28 with rectified voltage from the power rectifier 60 if the rectified voltage meets or exceeds an operational threshold voltage for the IC 28. The power manager 44 can also be configured operate the IC 28 with current derived from the power rectifier 60 if the current meets or exceeds an operational threshold current for the IC 28.

With continuing reference to FIG. 4, the power manager 44 is configured to control the distribution of the RF power received from the power rectifier 60 according to exemplary operation described above in FIG. 3. As previously discussed above in FIG. 3, the power manager 44 controls the power import/export switch 42 to control storage of excess energy derived from excess received RF power in the energy storage device 36 (block 54 in FIG. 3) and access stored energy from the energy storage device 36 (block 56), respectively, for continued RFID tag 20 operation (block 56). For example, the power manager 44 can be configured to control the power import/export switch 42 to store excess energy in the energy storage device 36 when the voltage derived from the excess received RF power exceeds an operational threshold voltage for the IC 28. Alternatively, the power manager 44 can configured to control the power import/export switch 42 to store excess energy in the energy storage device 36 when the current derived from the excess received RF power exceeds an operational threshold current for the IC 28.

A control line 66 is provided between the power manager 44 and the power import/output switch 42 in this embodiment. The power manager 44 communicates a signal over control line 66 to a control node 40F to control whether the power import/export switch 42 is set to connect export node 40D to the energy storage device 36 to store excess energy derived from excess received RF power, or set to connect import node 40C to the energy storage device 36 to access stored energy from the energy storage device 36 for RFID tag 20 operation. Excess energy derived from excess received RF power is provided from the power manager 44 over power supply line 68 to the power import/export switch 42 to be directed to and stored in the energy storage device 36. Accessed energy from the energy storage device 36 to provide power is provided from the power import/export switch 42 over power access line 69 to the power manager 44 to be distributed to components of the RFID IC chip 30 to power the RFID tag 20. For example, the power manager 44 can be configured to access stored excess energy in the energy storage device 36 if a voltage derived from the received RF power is less than an operational threshold voltage for the IC 28. Alternatively, the power manager 44 can be configured to access stored excess energy in the energy storage device 36 if a current derived from received RF power is less than the operational threshold current for the IC 28.

With continuing reference to FIG. 4, control logic 70 is also provided in the RFID IC chip 30 and is coupled to the power manager 44. The control logic 70 is also configured to access received RF power from the power manager 44 to operate optional visual indicator 72 if sufficient RF power is present for operation. The control logic 70 may be configured to access received RF power from the power manager 44 to operate only the visual indicator 72, only the RFID IC 28, or both the visual indicator 72 and the RFID IC 28, based on design and configuration of the power manager 44. In one embodiment, the power manager 44 uses received RF power to power the RFID IC 28 as higher priority over the visual indicator 72. The power manager 44 is configured to direct RF power received from wireless RF signal 32 in positive power margin conditions and access stored energy from the energy storage device 36 in negative power conditions, as previously described. The visual indicator 72 may be provided to allow the RFID tag 20 to provide visual indications of status or other information to a human user or technician for any purpose or application desired. The visual indicator 72 may be a light emitting diode (LED) as a non-limiting example. Also, the visual indicator 72 may be activated to emit light in patterns, such as flashing, and in different periodicities, to indicate different statuses. The visual indicator 72 may be controlled according to the embodiments disclosed in U.S. Pat. No. 7,965,186 entitled "Passive RFID Elements having Visual Indicators," which is incorporated herein by reference in its entirety.

With continuing reference to FIG. 4, the control logic 70 controls or gates whether RF power is accessed from the power manager 44. The control logic 70 contains circuitry to determine when the visual indicator 72 should be activated. If the visual indicator 72 should be activated, the control logic 70 accesses power from the power manager 44 to activate the visual indicator 72. In this instance, the power required to activate the visual indicator 72 may be considered as part of the operational threshold power for the RFID IC 28 to be considered by the power manager 44 to determine if excess RF energy in RF power from the received wireless RF signals 32 is present according to block 52 in FIG. 3, previously described above. Alternatively, the power required to activate the visual indicator 72 may be considered an additional visual indicator threshold energy (e.g., includes minimum of 0.7 V) that is added to the operational threshold power for the RFID IC 28 for consideration of power requirements by the power manager 44 for RFID tag 20 operation. In either case, the power manager 44 can be configured to activate a visual indicator 72 with received RF power from the RFID tag antenna 26 if the RF power is sufficient for RFID IC 28 operation and visual indicator 72 operation. The power manager 44 can also be configured to activate a visual indicator 72 with accessed RF power from the energy storage device 36 if sufficient RF power is not available from the received wireless RF signals 32 for RFID IC 28 operation and visual indicator 72 operation.

With continuing reference to FIG. 4, an optional current limiter 74 may be provided between the control logic 70 and the visual indicator 72. The current limiter 74 limits current accessed from the power manager 44 according to the specifications of the visual indicator 72 and conserves power access for the visual indicator 72, as desired or needed. For example, it may not be required to access the maximum current possible to be accessed by the visual indicator 72 to provide sufficient light intensity for the RFID tag 20 to sufficiently indicate a status or other information to a human operator or technician.

To increase the maximum voltage attainable across the energy storage device 36, an optional charge pump 76 may also be employed in the RFID IC chip 30, as illustrated in FIG. 4 As shown in FIG. 4, the charge pump 76 is coupled between the power manager 44 and the power import/export switch 42 in the power supply line 68 in this embodiment. For example, the charge pump 76 being at eighty percent (80%) efficiency may be able to take excess direct current (DC) currents available from the power manager 44 from the excess energy derived from excess received RF power and charge up the energy storage device 36 at twice the operational threshold voltage of the RFID IC 28 and with a current equal to half the RFID IC's 28 output current multiplied by the efficiency factor. For example, the charge pump 76 may take an input DC voltage of the excess power in the range of 1.0-1.5 V on the power supply line 68 and increase a DC output voltage of the excess RF power in the range of 2.0-3.0 VDC. The charge pump 76 may also be employed to provide a sufficient voltage in the energy storage device 36 to operate both the RFID IC 28 and the external visual indicator 72 for the visual indicator operation. The charge pump 76 may be desired or required to provide a high enough RF power voltage to operate both the RFID IC 28 and the external visual indicator 72.

The RFID tag 20 in FIG. 2 can be employed in applications to identify and track articles of manufacture. In this regard, the RFID tag 20 could be attached or integrated to a component to be identified and/or tracked. RFID technology can also be useful in mapping connections between connectors and adapters as part of a RFID tag connection system. For example, U.S. patent application Ser. No. 13/418,752 filed on Mar. 13, 2012 and entitled "Radio Frequency Identification (RFID) in Communication Connections, Including Fiber Optic Components," and incorporated herein by reference in its entirety, describes a RFID tag connection system between fiber optic connectors and adapters. A non-limiting example of such a RFID tag connection system 80 that can employ the RFID tag 20 in FIG. 2 is illustrated in FIG. 5.

Figure 5:
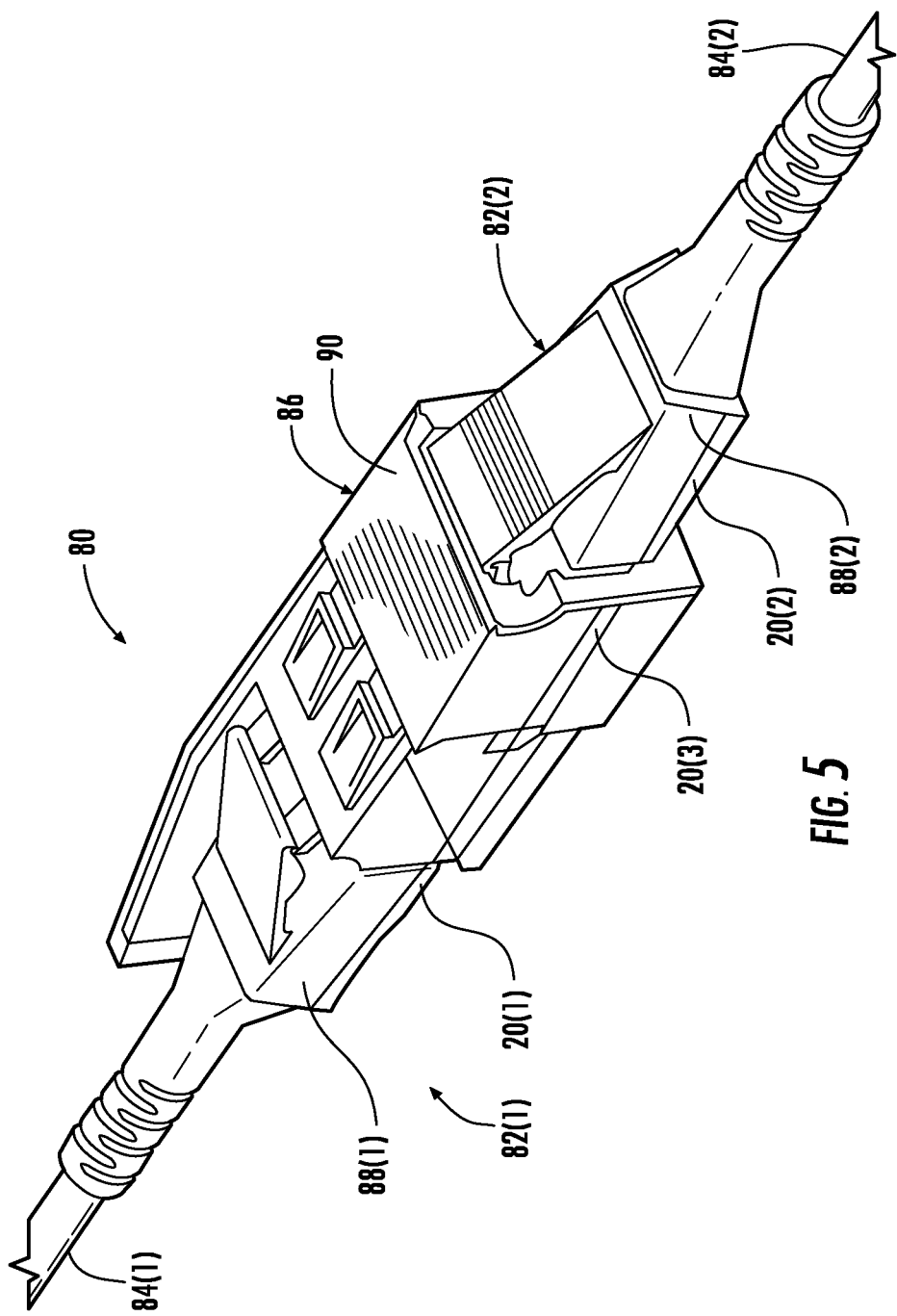
FIG. 5 illustrates a top perspective view of an exemplary excess RF power storage and power sharing RFID tag connection system comprised of two RFID tag-equipped duplex LC fiber optic connectors electrically connected at an intermediary RFID tag-equipped duplex LC fiber optic adapter.

As illustrated in FIG. 5, two fiber optic connectors 82(1), 82(2) each connected to respective fiber optic cables 84(1), 84(2), are optically connected by connection to a fiber optic adapter 86. The fiber optic connectors 82(1), 82(2) and fiber optic adapter 86 in FIG. 5 are duplex LC connectors and adapters, but could be any other type of connector and adapter. Each of the fiber optic connectors 82(1), 82(2) contains a RFID tag 20(1), 20(2), as illustrated in FIG. 5. The fiber optic adapter 86 also contains a RFID tag 20(3), as illustrated in FIG. 5. The RFID tags 20(1)-20(3) can be integrated into the housings 88(1), 88(2) of the fiber optic connectors 82(1), 82(2) and housing 90 of the fiber optic adapter 86, respectively, as described in U.S. patent application Ser. No. 12/774,898. The RFID tags 20(1)-20(3) in this embodiment are like the RFID tag 20 in FIG. 2 that contains the energy storage device 36 and power manager 44 in the RFID IC 28 to store excess energy derived from excess received RF power for operating the RFID tag 20 when sufficient external RF power is not being received by the RFID tag 20.

With continuing reference to FIG. 5, and as also described in U.S. patent application Ser. No. 12/774,898, the RFID tags 20(1)-20(3) are also configured to be electrically connected to each other. In this manner, the RFID tags 20(1)-20(3) can communicate with each other over electrical connections to exchange and store each other's identity information representative of connections between the fiber optic connectors 82(1), 82(2) and the fiber optic adapter 86. A RFID reader, such as the RFID reader 22 in FIG. 2, can interrogate the RFID tags 20(1)-20(3) to obtain the exchanged identity information as being representative of connections. The RFID reader 22 (or other system that can communicate with the RFID reader 22) can therefore track connections in addition to location and/or other information about the fiber optic connectors 82(1), 82(2) and the fiber optic adapter 86. However, if any of the RFID tags 20(1)-20(3) are not receiving sufficient RF power for RFID tag operation and do not have enough stored energy in its energy storage device 36 for RFID tag operation, such RFID tag 20(1)-20(3) would not be operational for exchanging and maintaining exchanged identity information with other operable RFID tags 20(1)-20(3). However, as discussed in more detail below, the energy storage devices 36 of the respective RFID tags 20(1)-20(3) can be electrically coupled together to form a shared energy storage device when the fiber optic connectors 82(1), 82(2) are connected to the fiber optic adapter 86 in FIG. 5, such that excess RF energy stored in any RFID's 20(1)-20(3) energy storage devices 36 can be accessed by any other RFID tag 20(1)-20(3) for operational power.

Figure 6:
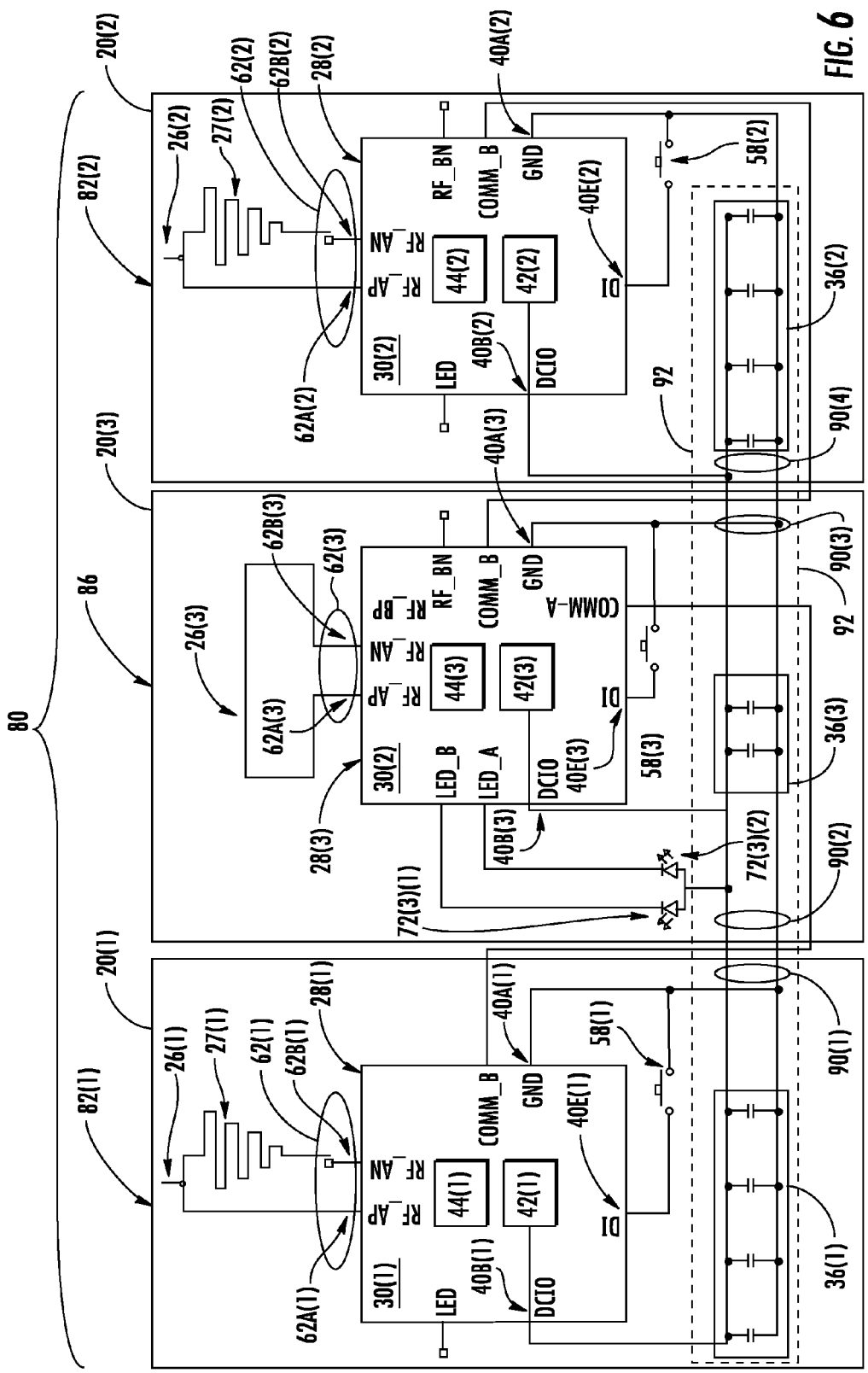
FIG. 6 is a schematic diagram illustrating an exemplary excess RF power storage and power sharing RFID tag connection system ("RFID tag connection system") that can be provided in the RFID tag connection system of FIG. 5, the RFID tag connection system comprised of three exemplary electrically connected RFID tags, wherein the RFID tags are configured to store excess energy derived from excess received RF power in shared energy storage devices when the RFID tag experiences positive power margin, and accessing stored energy in the shared energy storage device to provide power to operate a RFID tag(s) when the RFID tag(s) experiences negative power margin.

In this regard, FIG. 6 is a schematic diagram illustrating the exemplary excess RF power storage and power sharing RFID tag connection system 80 (referred to herein as "RFID tag connection system 80") in FIG. 5 described above. The RFID tag connection system 80 includes the three RFID tags 20(1)-20(3) previously referenced and described with regard to FIG. 5. Other components of the RFID tags 20(1)-20(3) in the RFID tag connection system 80 in FIG. 6 that are common to components in RFID tag 20 in FIG. 2 are labeled with common element numbers, but noted with parenthesis (e.g., 20(2)) to identify multiple versions.

As illustrated in FIG. 6, each RFID tag 20(1)-20(3) has an associated energy storage device 36(1)-36(3). Each energy storage device 36(1)-36(3) may have the same energy storage capacity or different energy storage capacities depending on design. The RFID tags 20(1), 20(3) include conductors 90(1), 90(2), respectively, that are configured to electrically connect the energy storage devices 36(1) and 36(3) together when the fiber optic connector 82(1) is connected to fiber optic adapter 86. The RFID tags 20(2), 20(3) also include conductors 90(4), 90(3), respectively, that are configured to electrically connect the energy storage devices 36(2) and 36(3) together when the fiber optic connector 82(2) is connected to fiber optic adapter 86. In this manner, these electrical connections couple the energy storage devices 36(1)-36(3) together to form a shared energy storage device 92. When a power manger 44(1)-44(3) of a RFID tag 20(1)-20(3) stores excess energy to or accesses stored energy from its associated energy storage device 36(1)-36(3) as previously discussed, the excess RF energy or accessed stored energy is from shared energy storage device 92 sharing stored energy among each of the individual energy storage devices 36(1)-36(2). From the power managers' 44(1)-44(3) perspectives, the shared energy storage device 92 is functionally equivalent to an individual energy storage device 36(1)-36(3).

Providing the shared energy storage device 92 allows a RFID tag 20(1)-20(3) to continue to operate if not receiving sufficient RF power for RFID tag operation and not enough RF power is contained in its associated energy storage device 36(1)-36(3), but sufficient stored energy is contained in another energy storage device 36(1)-36(3) that can be accessed for RFID operation. Providing a shared energy storage device 92 allows an increased capacity for storing excess RF energy. The capacitances provided in the RFID tags 20(1)-20(3) do not have to be equal. For example, the total capacitance of the shared energy storage device 92 may be 81.6 µF, which includes a capacitance of 44 µF in the energy storage device 36(3) in RFID tag 20(3), and capacitance from the energy storage devices 36(1), 36(2) in RFID tags 20(1), 20(2), each having a capacitance of 18.8 µF as a non-limiting example. In this example, the capacitance provided in the energy storage device 36(3) is greater than provided in the energy storage devices 36(1) and 36(2), because there are two (2) visual indicators 72(3)(1), 72(3)(2) provided in RFID tag 20(3) that require additional power for operation not included in RFID tags 20(1) and 20(2).

Also note that although each of the RFID tags 20(1)-20(3) is shown in FIG. 6 to include their own respective energy storage devices 36(1)-36(3), such is not required. Less than all of the RFID tags 20(1)-20(3) in FIG. 6 may include an energy storage device 36. In this scenario, stored energy by one RFID tag 20 may be used to provide power to another RFID tag 20 that does not include any energy storage device 36 if the RFID tag 20 not including the energy storage device 36 is electrically connected to an energy storage device 36 of another RFID tag 20.

Figure 7A:
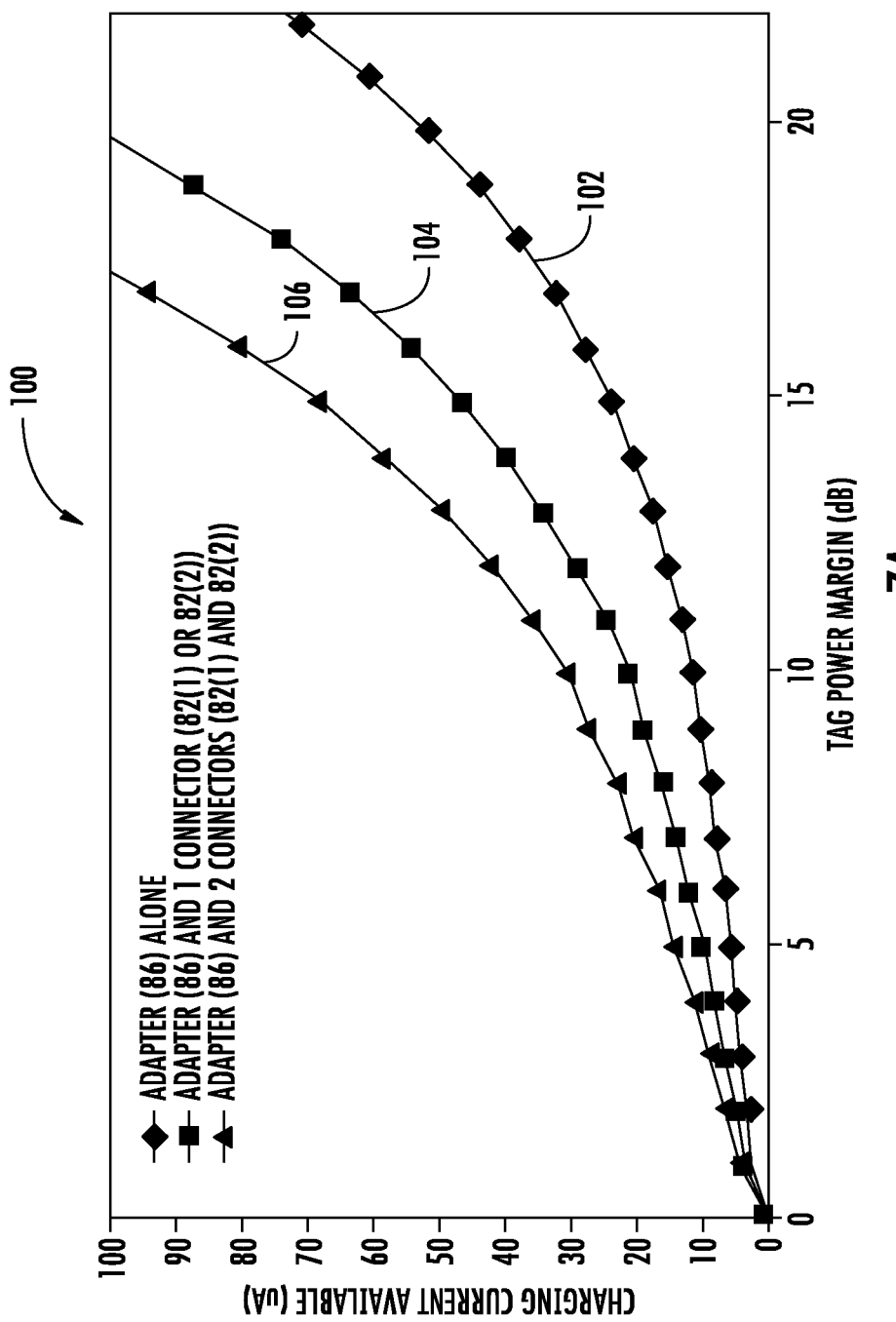
FIG. 7A is a graph illustrating exemplary charging current available to charge capacitors in the shared energy storage device in the RFID tag connection system in FIGS. 5 and 6 as a function of RFID tag power margin, for certain connection combinations of the RFID tags, when a charge pump is employed in the RFID tags to increase the voltage attainable across the shared energy storage devices.

To illustrate the exemplary performance of the RFID tag 20 in FIG. 2 and the RFID tag connection system 80 in FIGS. 5 and 6, various graphs are provided in FIGS. 7A-13 and are described below. FIG. 7A is a graph 100 illustrating exemplary charging current available to charge capacitors in various configurations of the shared energy storage device 92 in the RFID tag connection system 80 in FIGS. 5 and 6 as a function of RFID tag power margin. The graph 100 includes results while employing the optional charge pump 76 in the RFID IC 28, as illustrated in FIG. 4 and previously described above. The graph 100 has three curves: a first curve 102 representing data corresponding to only fiber optic adapter 86 in FIG. 5 (i.e., RFID tag 20(3)); a second curve 104 representing data corresponding to the fiber optic adapter 86 (i.e., RFID tag 20(3)) and one fiber optic connector (i.e., RFID tag 20(1) or RFID tag 20(2)) in FIG. 5; and a third curve 106 representing data corresponding to the fiber optic adapter 86 (i.e., RFID tag 20(3)) and both fiber optic connectors (i.e., RFID tag 20(1) and RFID tag 20(2)) in FIG. 5. The results in graph 100 show that the charging current to charge the shared energy storage device 92 is an increasing function with the RFID tag power margin, since more excess received RF power is captured with increasing RFID tag power margin and converted to charging current.

Figure 7B:
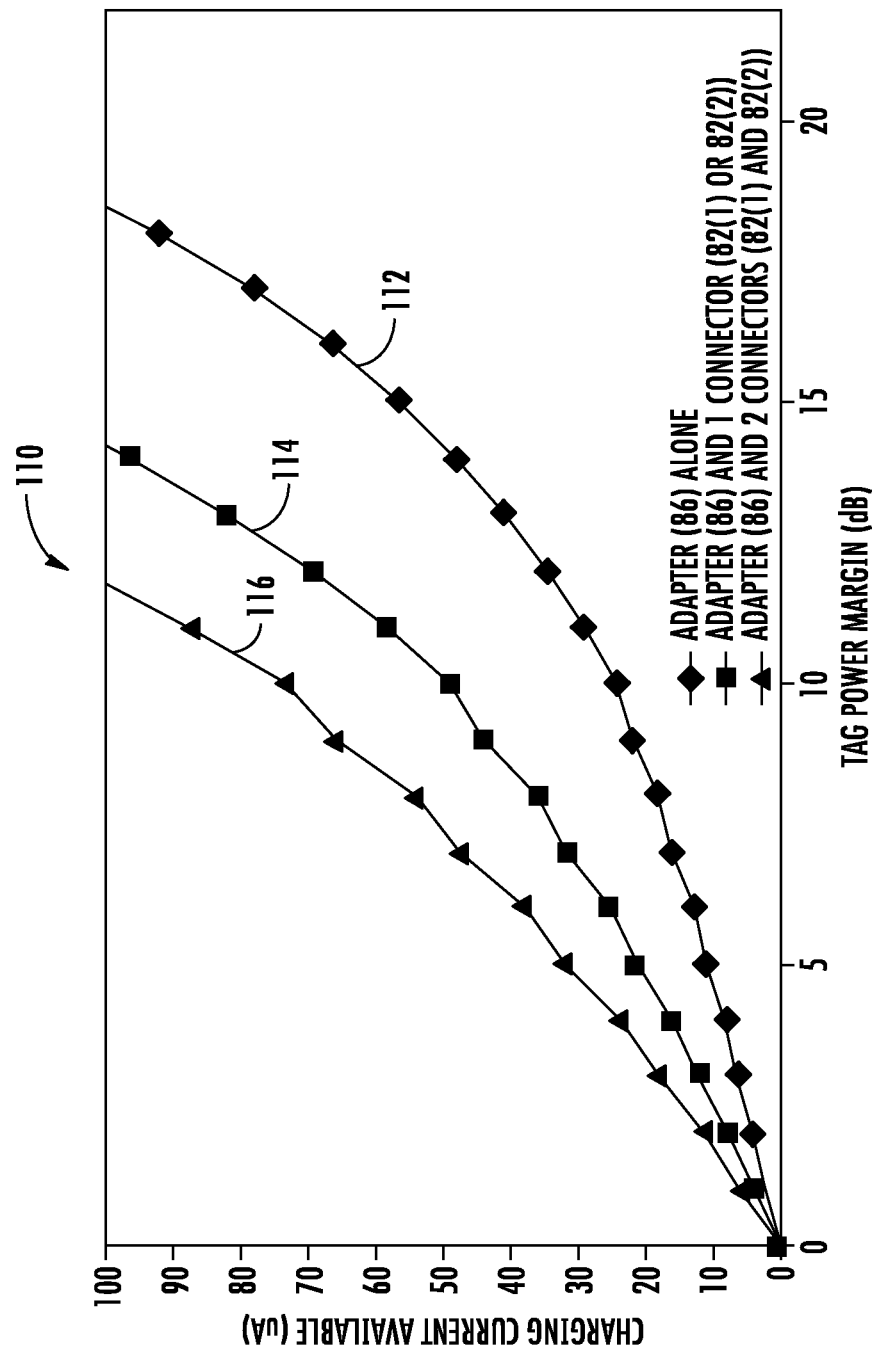
FIG. 7B is a graph illustrating exemplary charging current available to charge capacitors in the shared energy storage device in the RFID tag connection system in FIGS. 5 and 6 as a function of RFID tag power margin, for certain connection combinations of the RFID tags, when a charge pump is not employed in the RFID tags.

FIG. 7B is another graph 110 illustrating exemplary charging current available to charge capacitors in various configurations of the shared energy storage device 92 in the RFID tag connection system 80 in FIGS. 5 and 6 as a function of RFID tag power margin. The graph 110 includes results when the optional charge pump 76 in the RFID IC 28 illustrated in FIG. 4 is not employed. The graph 110 has three curves: a first curve 112 representing data corresponding to only fiber optic adapter 86 in FIG. 5 (i.e., RFID tag 20(3)); a second curve 114 representing data corresponding to the fiber optic adapter 86 (i.e., RFID tag 20(3)) and one fiber optic connector (i.e., RFID tag 20(1) or RFID tag 20(2)) in FIG. 5; and a third curve 116 representing data corresponding to the fiber optic adapter 86 (i.e., RFID tag 20(3)) and both fiber optic connectors (i.e., RFID tag 20(1) and RFID tag 20(2)) in FIG. 5. The results in graph 110 also show that the charging current to charge the shared energy storage device 92 is an increasing function with the RFID tag power margin, since more excess RF power is captured with increasing RFID tag power margin and converted to charging current. However, the results in graph 110 show more charging current available for charging the shared energy storage device 92 than in graph 100 since the charge pump 76 is not employed for the results in graph 110. A tradeoff of providing increased voltage when employing the charge pump 76 is less current.

FIG. 8A is a graph 120 illustrating exemplary times to fully charge the shared energy storage device in the RFID tag connection system in FIGS. 5 and 6 at start-up as a function of RFID tag power margin. The graph 120 includes results when the optional charge pump 76 in the RFID IC 28 illustrated in FIG. 4 is employed. The graph 120 has three curves: a first curve 122 representing data corresponding to only fiber optic adapter 86 in FIG. 5 (i.e., RFID tag 20(3)); a second curve 124 representing data corresponding to the fiber optic adapter 86 (i.e., RFID tag 20(3)) and one fiber optic connector (i.e., RFID tag 20(1) or RFID tag 20(2)) in FIG. 5; and a third curve 126 representing data corresponding to the fiber optic adapter 86 (i.e., RFID tag 20(3)) and both fiber optic connectors (i.e., RFID tag 20(1) and RFID tag 20(2)) in FIG. 5. While more charge current is available from multiple RFID tags 20(1)-20(3), the total amount of capacitance of the shared energy storage device 92 also increases with multiple RFID tags 20(1)-20(3). Thus, the results in graph 120 show that total charging time is similar for all three curves 122, 124, 126.

With continuing reference to FIG. 8A, as an example, consider the case of 5 dB RFID tag power margin. For a single RFID adapter tag 20(2), it would take approximately thirty-one (31) seconds to fully charge up the capacitor bank 38 of the energy storage device 36(2) mounted on the RFID tag 20(2). For the cases with one or two fiber optic connectors 82(1), 82(2) connected into the fiber optic adapter 86, if all RFID tags 20(1)-20(3) have 5 dB margin, the total capacitor charge times for the shared energy storage device 92 would be approximately twenty-two (22) seconds and nineteen (19) seconds from start-up, respectively, as illustrated in FIG. 8A. For RFID tag power margins of 12 dB or greater, the capacitor charging time falls below ten (10) seconds for any of the three (3) scenarios, as shown in curves 122, 124, 126.

Figure 8B:
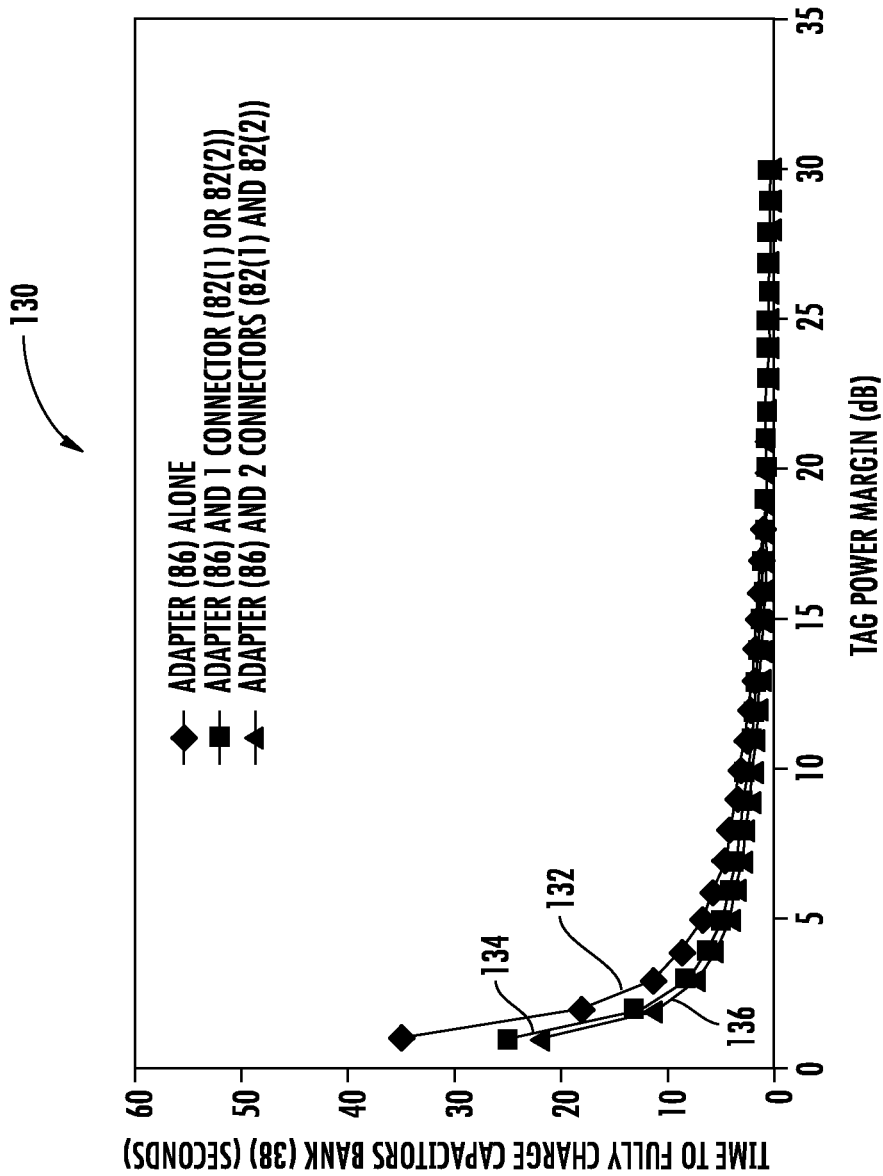
FIG. 8B is a graph illustrating exemplary times to fully charge capacitor banks in the shared energy storage device in the RFID tag connection system in FIGS. 5 and 6 at start-up as a function of RFID tag power margin, for certain connection combinations of the RFID tags, when a charge pump is not employed in the RFID tags.

FIG. 8B is a graph 130 illustrating exemplary times to fully charge the shared energy storage device in the RFID tag connection system in FIGS. 5 and 6 at start-up as a function of RFID tag power margin. The graph 130 includes results when the optional charge pump 76 in the RFID IC 28 illustrated in FIG. 4 is not employed. The graph 130 has three curves: a first curve 132 representing data corresponding to only fiber optic adapter 86 in FIG. 5 (i.e., RFID tag 20(3)); a second curve 134 representing data corresponding to the fiber optic adapter 86 (i.e., RFID tag 20(3)) and one fiber optic connector (i.e., RFID tag 20(1) or RFID tag 20(2)) in FIG. 5; and a third curve 136 representing data corresponding to the fiber optic adapter 86 (i.e., RFID tag 20(3)) and both fiber optic connectors (i.e., RFID tag 20(1) and RFID tag 20(2)) in FIG. 5. The time to fully charge the energy storage device 36(2) and the shared energy storage device 92 is less than the results provided in graph 120 in FIG. 8B, because the charge pump 76 was not employed thereby providing more charge current.

Figure 9A:
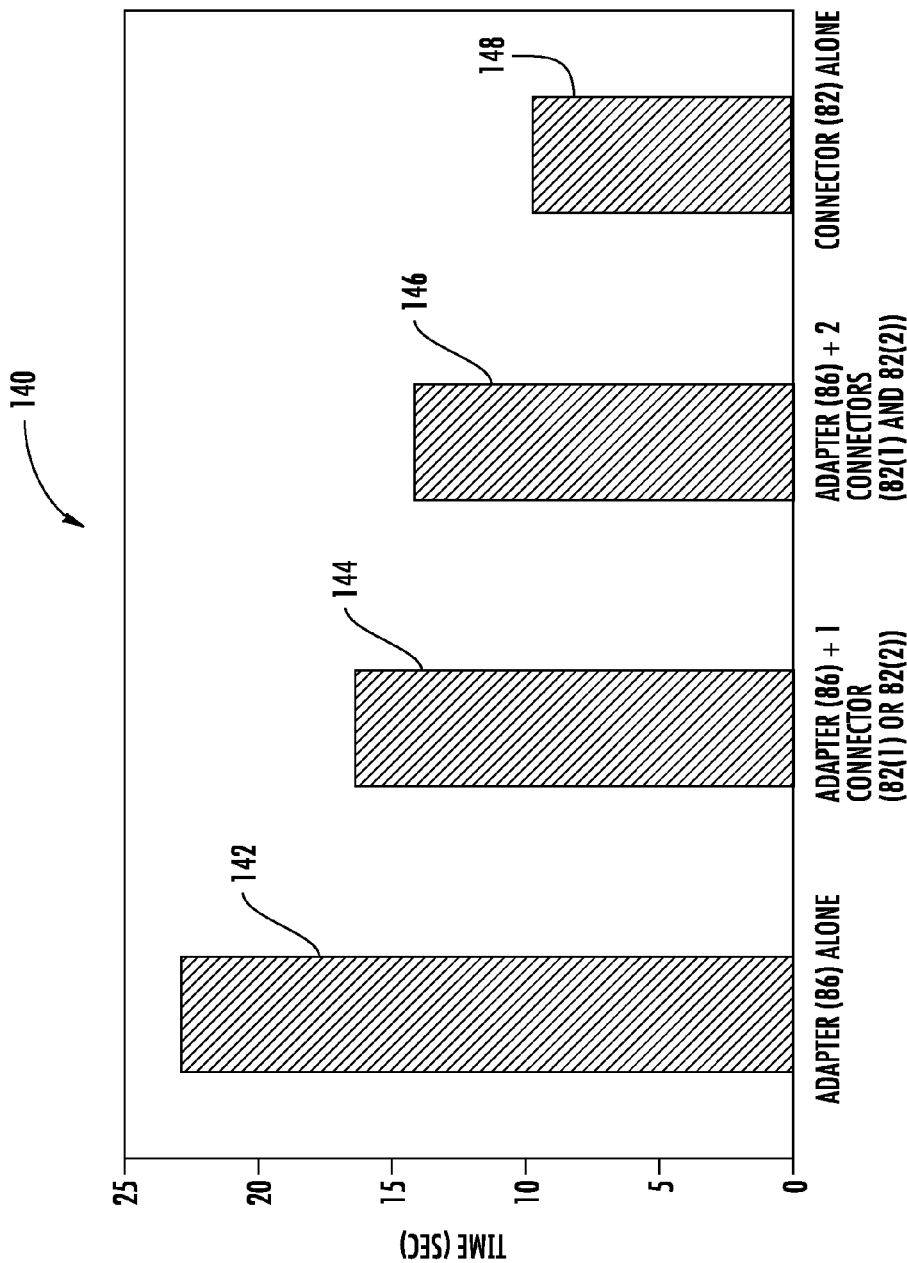
FIG. 9A is a graph illustrating exemplary times that certain connection combinations of RFID tags in the RFID tag in FIG. 2 and the RFID tag connection system in FIGS. 5 and 6 can remain operational after losing RF power by accessing stored energy from the shared energy storage device, when a charge pump is employed in the RFID tags.
Figure 9B:
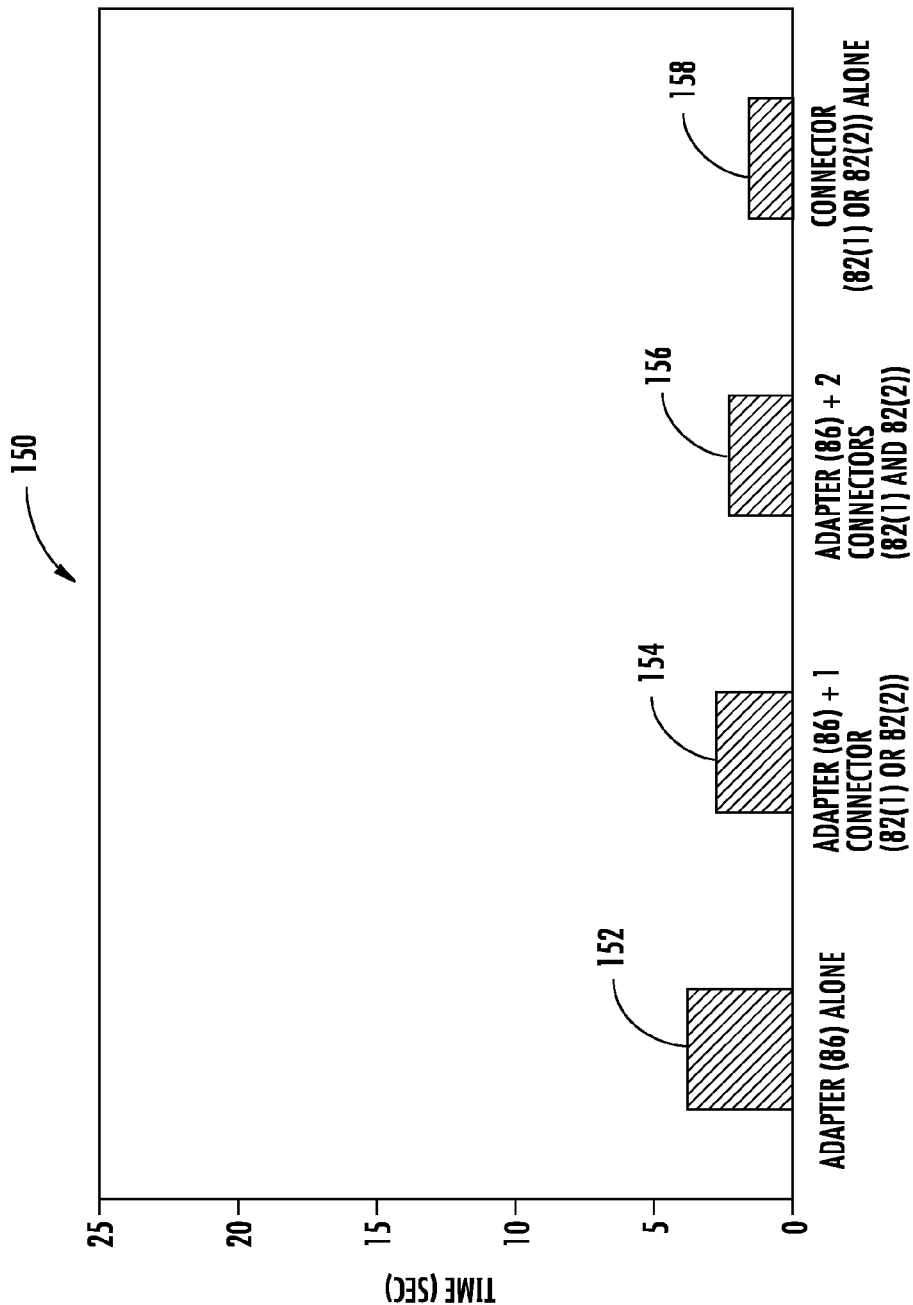
FIG. 9B is a graph illustrating exemplary times that certain connection combinations of RFID tags in the RFID tag in FIG. 2 and the RFID tag connection system in FIGS. 5 and 6 can remain operational after losing RF power by accessing stored energy from the shared energy storage device, when a charge pump is not employed in the RFID tags.

When current is accessed from an energy storage device 36 or a shared energy storage device 92, the current accessed is a function of the capacitor voltage level given by:

$$i_{IC} = P_{min}/V_{cap},$$

where $P_{min}$ is 7.5 uW in this example. The results for the analysis of RFID IC 28 operational time for a fully charged energy storage device 36 or a shared energy storage device 92 are illustrated in FIGS. 9A and 9B for four (4) possible configurations of the RFID tag connection system in FIGS. 5 and 6. FIG. 9A is a graph 140 illustrating exemplary times that certain connection combinations of RFID tags in the RFID tag 20 in FIG. 2 and the RFID tag connection system 80 in FIG. 5 can remain operational after losing RF power by accessing stored energy from the shared energy storage device 92, when the charge pump 76 is employed. The graph 140 has four bars: a first bar 142 representing data corresponding to only fiber optic adapter 86 in FIG. 5 (i.e., RFID tag 20(3)); a second bar 144 representing data corresponding to the fiber optic adapter 86 (i.e., RFID tag 20(3)) and one fiber optic connector (i.e., RFID tag 20(1) or RFID tag 20(2)) in FIG. 5; a third bar 146 representing data corresponding to the fiber optic adapter 86 (i.e., RFID tag 20(3)) and both fiber optic connectors (i.e., RFID tag 20(1) and RFID tag 20(2)) in FIG. 5; and a fourth bar 148 representing data corresponding to only a fiber optic connector 82 in FIG. 5 (i.e., RFID tag 20(1) or 20(2)). These results in bar 142 predict that the fiber optic adapter RFID tag 20(3) alone may continue to operate for almost twenty-three (23) seconds after RF power is lost. This operation time is shorter for the other three cases represented by bars 144, 146, and 148, because while all RFID tags 20(1)-20(3) require the same current to operate, the RFID tags 20(1), 20(2) for the fiber optic connectors 82(1), 82(2) contribute smaller capacitance in this example to the shared energy storage device 92 than the RFID tag 20(3) for the fiber optic adapter 86. Even so, the results suggest that the three RFID tags 20(1)-20(3) can remain on for about fourteen (14) seconds using the stored charge in the shared energy storage device 92, assuming a maximum voltage of 3.0 V.

FIG. 9B is a graph 150 illustrating exemplary times that certain connection combinations of RFID tags in the RFID tag 20 in FIG. 2 and the RFID tag connection system 80 in FIG. 5 can remain operational after losing RF power by accessing stored energy from the shared energy storage device 92 to provide power, when the charge pump 76 is not employed. The graph 150 has four bars: a first bar 152 representing data corresponding to only fiber optic adapter 86 in FIG. 5 (i.e., RFID tag 20(3)); a second bar 154 representing data corresponding to the fiber optic adapter 86 (i.e., RFID tag 20(3)) and one fiber optic connector (i.e., RFID tag 20(1) or RFID tag 20(2)) in FIG. 5; a third bar 156 representing data corresponding to the fiber optic adapter 86 (i.e., RFID tag 20(3)) and both fiber optic connectors (i.e., RFID tag 20(1) and RFID tag 20(2)) in FIG. 5; and a fourth bar 158 representing data corresponding to only a fiber optic connector 82 in FIG. 5 (i.e., RFID tag 20(1) or 20(2)). The times that the RFID tags 20(1)-20(3) remain operational is less than provided in the results in graph 140 in FIG. 9A, because the charge pump 76 was not employed to provide additional voltage in the energy storage device 36 or shared energy storage device 92. Thus, the stored energy accessed from the energy storage devices 36 or shared energy storage device 92 brings the voltage of the energy storage devices 36 or shared energy storage device 92 down below the operational threshold voltage for RFID tag 20 operation sooner. However, as previously discussed, the advantage of not employing the charge pump 76 is less charging time for the energy storage devices 36 or shared energy storage device 92.

Figure 10A:
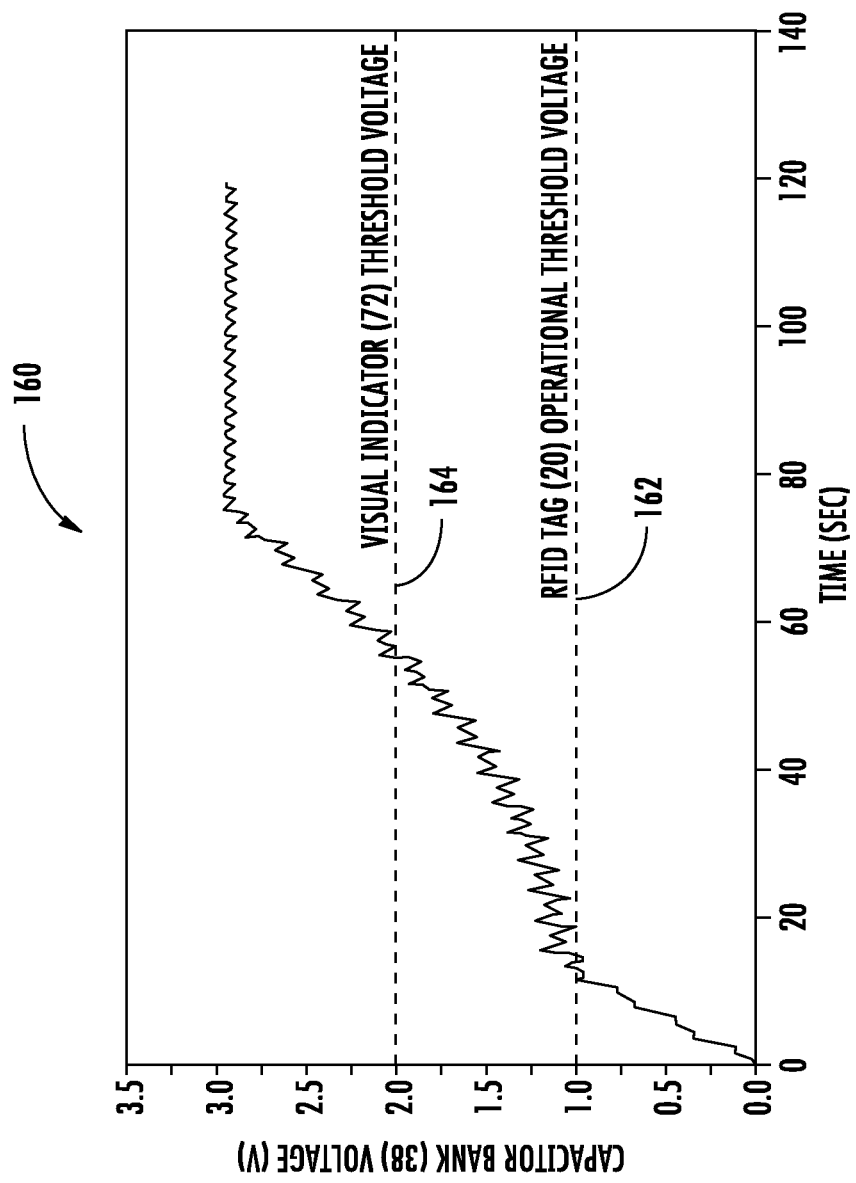
FIG. 10A is a graph illustrating exemplary capacitor bank voltage as a function of time for a single RFID tag, such as the RFID tag in FIG. 2, from startup of the RFID tag during positive power margin times of the RFID tag, when a charge pump is employed in the RFID tag.

FIG. 10A is a graph 160 illustrating exemplary energy storage device 36 voltage as a function of time for a single RFID tag, such as the RFID tag 20 in FIG. 2, from startup of the RFID tag during positive power margin times of the RFID tag. The results in graph 160 are when the charge pump 76 in FIG. 4 is employed in the RFID IC 28. The graph 160 shows that continuous operation of the RFID tag 20 is possible after the capacitor bank 38 of the energy storage device 36 becomes charged to a voltage level exceeding the RFID tag operational threshold voltage 162 (e.g., 1 V) required to operate the RFID IC 28. As shown in FIG. 10A, the voltage across the capacitor bank 38 of the energy storage device 36 starts at 0 V when the RFID tag 20 is first turned on. The voltage gradually increases during the periods when the RFID tag 20 is exposed to the excess RF energy received by the RFID tag antenna 26 during positive power margin conditions. When the voltage of the capacitor bank 38 of the energy storage device 36 exceeds the RFID tag operational threshold voltage 162, the energy storage device 36 can start to supply current to the RFID IC 28 for operation during the time periods when negative power margin conditions exist. If the voltage across the capacitor bank 38 of the energy storage device 36 exceeds a visual indicator threshold voltage 164, both the RFID tag 20 and the visual indicators 72 in FIG. 4 can be operational.

Figure 10B:
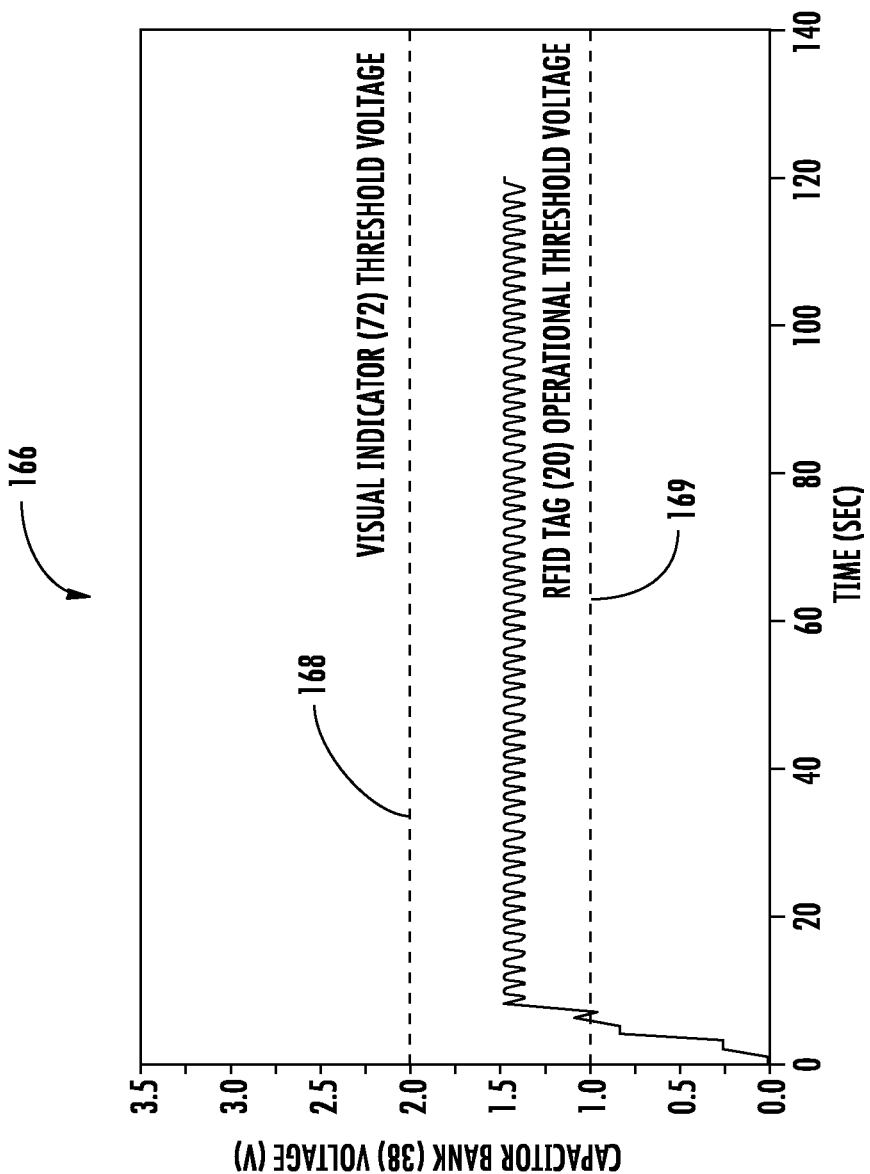
FIG. 10B is a graph illustrating exemplary capacitor bank voltage as a function of time for a single RFID tag, such as the RFID tag in FIG. 2, from startup of the RFID tag during positive power margin times of the RFID tag, when a charge pump is not employed in the RFID tag.

FIG. 10B is a graph 166 illustrating exemplary energy storage device 36 voltage as a function of time for a single RFID tag, such as the RFID tag 20 in FIG. 2, from start-up of the RFID tag during positive power margin times of the RFID tag. The results in graph 160 are when the charge pump 76 in FIG. 4 is not employed in the RFID IC 28. The graph 166 shows that continuous operation of the RFID tag 20 is possible after the capacitor bank 38 of the energy storage device 36 becomes charged to a voltage level exceeding the RFID tag operational threshold voltage 169 (e.g., 1 V) required to operate the RFID IC 28. As shown in FIG. 10B, the voltage across the energy storage device 36 starts at 0 V when the RFID tag 20 is first turned on. The voltage gradually increases during the periods when the RFID tag 20 is exposed to the excess RF energy received by the RFID tag antenna 26 during positive power margin conditions. When the voltage of the energy storage device 36 exceeds the RFID tag operational threshold voltage 169, the energy storage device 36 can start to supply current to the RFID IC 28 for operation during the time periods when negative power margin conditions exist. The voltage across the capacitor bank 38 of the energy storage device 36 does not exceed a visual indicator threshold voltage 168, because the charge pump 76 in FIG. 4 is not employed to increase the voltage of the excess energy stored in the energy storage device 36.

As a further explanation of the benefit of the RFID tag connection system 80 with connective RFID tags 20(1)-20(3) to provide shared energy storage device 92, assume that four RFID reader antennas are switched from one to another sequentially by the RFID reader 22 in FIG. 2 with a one (1) second dwell time for each RFID reader antenna. Further assume that RFID tag 20(1) has a negative power margin with three (3) of the four (4) RFID reader 22 antennas and 19 dB power margin with the other RFID reader 22 antenna. Further assume RFID tag 20(2) has negative power margin with all four (4) RFID reader 22 antennas. Further assume RFID tag 20(3) has negative power margin with three (3) of the four (4) RFID reader 22 antennas and 16 dB power margin with the fourth RFID reader 22 antenna. The received RF power as a function of time for each of the three RFID tags 20(1)-20(3) are shown in graphs 170, 172, and 174 in FIGS. 11A-11C respectively. If these were conventional passive RFID tags, the RFID tags' 20(1)-20(3) ON/OFF states would simply be dictated by whether the received RF power was above or below the −16 dBm power threshold. In that case, RFID tag 20(1) and RFID tag 20(3) would be off three (3) out of every four (4) seconds. RFID tag 20(2) would never turn on, because RFID tag 20(2) never receives enough RF power from the RFID reader 22 in this example.

FIGS. 12A-12C are graphs 180, 182, 184 illustrating exemplary on/off states of the three exemplary electrically connected RFID tags 20(1)-20(3), respectively, as a function of time when the excess RF power storage and power sharing in the RFID tag connection system of FIGS. 5 and 6 is employed. The voltage level of the capacitor bank 38 in the energy storage devices 36 is in excess of the RFID tag operational threshold voltage from thirteen (13) to fourteen

(14) seconds. After this time, the capacitor bank 38 voltage is high enough to sustain all three RFID tags 20(1)-20(3) during periods of RF power outage. The on/off states of the RFID tags 20(1)-20(3) are shown in FIGS. 12A-12C, respectively, which show all RFID tags 20(1)-20(3) being continuously operable after the time when the capacitor bank 38 voltage crosses the RFID tag operational threshold voltage. Even RFID tag 20(2) will be continuously on after this time, although it has negative power margin with all four (4) RFID reader 22 antennas. RFID tag 20(2) is sustained by the stored energy in the shared energy storage device 92. This RFID tag connection system model in FIGS. 12A-12C illustrates behavior and performance that is not provided with conventional passive RFID tags.

Figure 13:
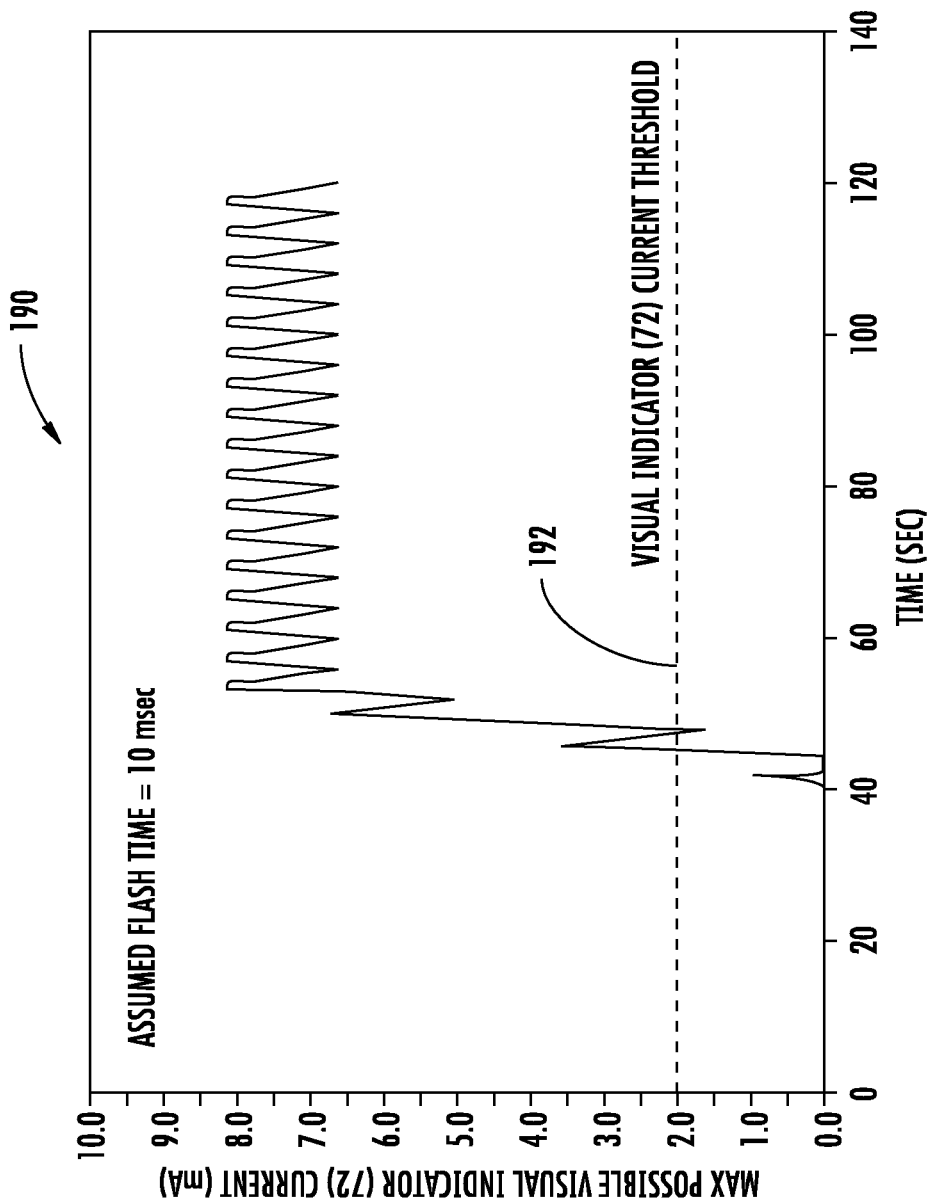
FIG. 13 is a graph illustrating exemplary possible current available to power a visual indicator of the RFID tag in FIG. 2.

FIG. 13 is a graph 190 that illustrates a possible application of providing power from shared energy in the shared energy storage device 92 for the RFID tag connection system 80 in FIGS. 5 and 6. The application involves providing current for flashing a visual indicator 72 in FIG. 4 attached to a RFID tag 20. In this example, the graph 190 illustrates the maximum possible current that could be delivered by the capacitor bank 38 of the shared energy storage device 92 assuming a flash time of ten (10) milliseconds (ms) and a visual indicator 72 threshold voltage of 2.0 V. The results in graph 190 show that at around time=40 seconds, there is positive potential current for a visual indicator 72 flash. After that at approximately time=50 seconds, the maximum potential current stays above the desired two (2) milliamps (mA) visual indicator 72 current threshold 192. Note that if the visual indicator 72 modeled in graph 190 is attached to the fiber optic adapter 86 in the RFID tag 20(3) in the example of the RFID tag connection system 80, the visual indicator 72 can be flashed via the shared energy storage device 92 even though RFID tag 20(3) can have negative power margin with respect to all RFID reader 22 antennas.

Figure 14:
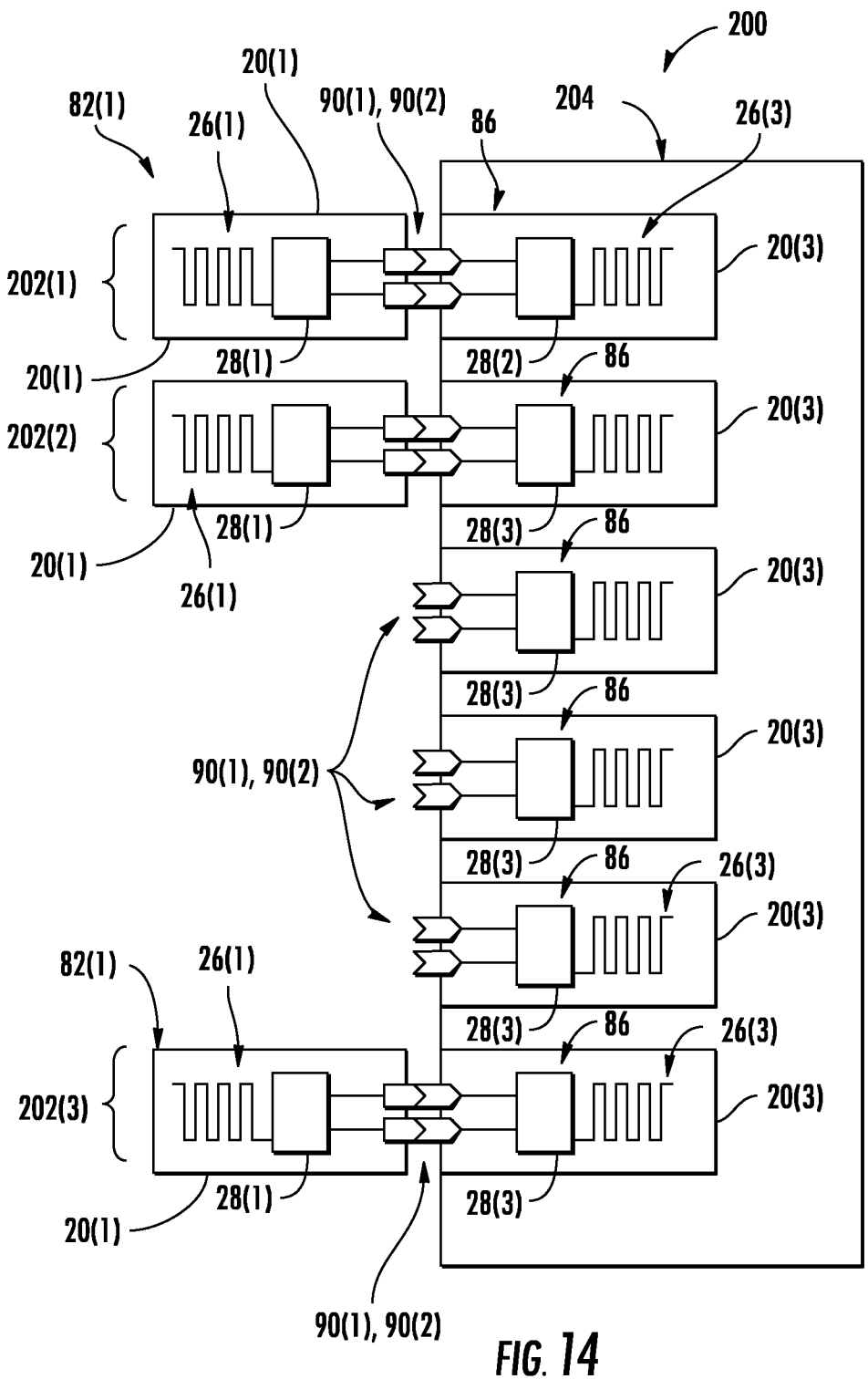
FIG. 14 is a schematic diagram of exemplary application that includes excess RF power storage and power sharing RFID tag connection systems.

The excess RF power storage and power sharing RFID tag connection systems disclosed herein can be employed in any application desired for continuous RFID tag operation. For example, FIG. 14 is a schematic diagram of an exemplary communications system 200 that includes RFID tag connection systems 202(1)-202(3) similar to the RFID tag connection system 80 in FIGS. 5 and 6. In this example, the RFID tag connection systems 202(1)-202(3) each include only one fiber optic connector 82(1) connected to the fiber optic adapter 86 to provide the shared energy storage device 92 (see FIG. 6). However, the principles and operation of the RF power storage and RF power sharing described above still applies in the RFID tag connection systems 202(1)-202(3).

With reference to FIG. 14, the communications system is a patch panel 204. The patch panel 204 is configured to accept connection from fiber optic connectors 82(1). For example, the patch panel 204 may be provided in a fiber optic module containing the fiber optic adapters 86 each configured to receive the fiber optic connectors 82(1) to establish optical connections. As previously discussed with regard to FIG. 6, the RFID tags 20(1), 20(3) include conductors 90(1), 90(2) that are configured to electrically connect the energy storage devices 36(1) and 36(3) together when the fiber optic connector 82(1) is connected to fiber optic adapter 86. These connections form a shared energy storage device that can be used by either RFID tags 20(1), 20(3) in the fiber optic connector 82(1) and fiber optic adapter 86, respectively, to store excess energy derived from excess received RF power and share excess energy to provide power for RFID tag operation. Alternatively, the patch panel 204 may be electrical equipment wherein each of the fiber optic adapters 86 are electrical sockets configured to receive components in the form of electrical plugs to establish electrical connections.

The disclosed technologies can be configured in different ways, resulting in different functionalities. In addition to the examples provided above, the RFID tags disclosed herein may be located on a plug (such as a connector), a socket (such as an adapter), a housing, a cabinet, an equipment rack, a component or patch panel, a separate object, or other components (or portions thereof). Further, although examples of components employing the excess RF power storage and power sharing RFID tags and RFID tag connections systems are employed with electrical and/or optical equipment, component assemblies, and cables, the components disclosed herein can be associated with any type of articles of manufacture for any type of application. For example, components with excess RF power storage and power sharing RFID tags and RFID tag connection systems may be integrated at or near various interconnection locations and articles of manufacture along an electrical or optical network, at or near various interconnection locations along a utility distribution system, such as distribution systems dedicated to energy (e.g., electric power, oil, natural gas), information (telephone, cable, DSL or internet access) or water and sewer service. This network can be incorporated into any system, such as an automobile electrical harness; an optical network for an airplane, ship or ground-based transportation system; a control network for railroad switchgear; or a LAN integrated into a building. Components with excess energy storage and energy sharing RFID tags and RFID tag connection systems can also be integrated at or near various interconnection locations and articles of manufacture along a utility distribution system, such as distribution systems dedicated to energy (e.g., electric power, oil, natural gas), information (telephone, cable, DSL or internet access) or water and sewer services. Components with the excess energy storage and energy sharing RFID tags and RFID tag connection systems could be temporarily installed networks and interconnection systems and articles of manufacture such as fire hoses, sports or performance events, or power and communications networks associated with military deployment. Other applications include specific locations across a two-dimensional (2D) array of panels, examples of which include floor tiles with temperature or pressure sensors for building security or environmental control, ceiling tiles with integrated motion or fire sensors, or load sensors integrated into modular sections that are assembled to create floors, roofs, roads or bridges.

Any functionalities disclosed in any embodiments may be incorporated or provided in any other embodiments with suitable circuitry and/or devices. Although the illustrated embodiments are directed to excess RF power storage and power sharing passive RFID tags and passive RFID tag connection systems, further embodiments include one or more semi-passive or active RFID tags depending upon the particular functionality of the excess RF power storage and power sharing RFID tag connection system desired. The excess RFID RF power storage and power sharing RFID tags can also be employed in any application desired, including but not limited to fiber optic connectors, optical fiber cables and cable assemblies, fiber optic cable management hardware and devices, electrical connectors, medical devices, pharmaceutical containers, credit cards, employee badges, facility entry devices, fluid couplings, beverage dispensing containers, industrial controls, environmental monitoring devices, connection of consumer electronics, electronics assemblies and subassemblies, containers and lids, doors and doorframes, windows and sills, and many other applications.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Electrical coupling can include both internal and external coupling or accessibility. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in volatile memory, non-volatile memory, Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A RFID tag connection system, comprising:
   a first RFID tag comprising at least one first antenna configured to receive first RF power in received first wireless RF signals, a first energy storage device configured to store excess energy derived from excess received first RF power, and one or more first energy sharing conductors coupled to the first energy storage device; and
   a second RFID tag comprising at least one second antenna configured to receive second RF power in received second wireless RF signals, and one or more second energy sharing conductors;
   the first energy storage device forming a shared energy storage device when the one or more first energy sharing conductors of the first RFID tag are connected to the one or more second energy sharing conductors of the second RFID tag;
   the first RFID tag further comprises a first power manager configured to store excess energy derived from the excess received first RF power in the shared energy storage device if the received first RF power exceeds a first operational threshold power for the first RFID tag; and
   the second RFID tag further comprises a second power manager configured to store excess energy derived from excess received second RF power in the shared energy storage device if the received second RF power exceeds a second operational threshold power for the second RFID tag.

2. The RFID tag connection system of claim 1, wherein:
   the second RFID tag further comprises a second energy storage device coupled to the one or more second energy sharing conductors, the second energy storage device configured to store excess energy derived from excess received second RF power; and
   the first energy storage device coupled to the second energy storage device to form the shared energy storage device when the one or more first energy sharing conductors of the first RFID tag are connected to one or more second energy sharing conductors of the second RFID tag.

3. The RFID tag connection system of claim 2, wherein:
the second RFID tag further comprises a second energy storage device configured to store excess energy derived from excess received second RF power; and
the first energy storage device coupled to the second energy storage device forms the shared energy storage device when the one or more first energy sharing conductors of the first RFID tag are connected to one or more second energy sharing conductors of the second RFID tag.

4. The RFID tag connection system of claim 1, wherein the first power manager is further configured to access the stored excess energy in the shared energy storage device to provide power to operate the first RFID tag if the received first RF power from the at least one first antenna is less than the first operational threshold power for the first RFID tag.

5. The RFID tag connection system of claim 4, wherein the second power manager is further configured to access the stored excess energy in the shared energy storage device to provide power to operate the second RFID tag if the received second RF power from the at least one second antenna is less than the second operational threshold power for the second RFID tag.

6. The RFID tag connection system of claim 1, wherein the first power manager is further configured to operate the first RFID tag with the received first RF power from the at least one first antenna if the received first RF power meets or exceeds the first operational threshold power for the first RFID tag.

7. The RFID tag connection system of claim 6, wherein the second power manager is further configured to operate the second RFID tag with the received second RF power from the at least one second antenna if the received second RF power meets or exceeds the second operational threshold power for the second RFID tag.

8. The RFID tag connection system of claim 1, wherein the shared energy storage device is comprised of a first capacitor bank comprised of at least one first capacitor, and the second energy storage device is comprised of a second capacitor bank comprised of at least one second capacitor.

9. The RFID tag connection system of claim 1, wherein:
the first RFID tag further comprises one or more first communications conductors;
the second RFID tag further comprises one or more second communications conductors; and
the first RFID tag is further configured to send first communication signals to the second RFID tag when the one or more first communications conductors of the first RFID tag are electrically connected to the one or more second communications conductors of the second RFID tag.

10. The RFID tag connection system of claim 9, wherein the first RFID tag is configured to send an identity of the first RFID tag to the second RFID tag when the one or more first communications conductors of the first RFID tag are electrically connected to the one or more second communications conductors of the second RFID tag.

11. The RFID tag connection system of claim 9, wherein the second RFID tag is further configured to send second communication signals to the first RFID tag when the one or more first communications conductors of the first RFID tag are electrically connected to the one or more second communications conductors of the second RFID tag.

12. The RFID tag connection system of claim 11, wherein the second RFID tag is configured to send an identity of the second RFID tag to the first RFID tag when the one or more first communications conductors of the first RFID tag are electrically connected to the one or more second communications conductors of the second RFID tag.

13. The RFID tag connection system of claim 1, further comprising a third RFID tag comprising at least one third antenna configured to receive third RF power from received third wireless RF signals, and one or more third energy sharing conductors;
the third RFID tag further comprises a third power manager configured to store excess energy derived from excess received third RF power in the shared energy storage device if the received third RF power exceeds a third operational threshold power for the third RFID tag.

14. The RFID tag connection system of claim 13, wherein:
the third RFID tag further comprises a third energy storage device coupled to the one or more third energy sharing conductors, the third energy storage device configured to store excess energy derived from excess received third RF power; and
the third energy storage device coupled to the first energy storage device forms the shared energy storage device when the one or more third energy sharing conductors of the third RFID tag are connected to either: the one or more first energy sharing conductors of the first RFID tag or the one or more second energy sharing conductors of the second RFID tag.

15. A method of sharing stored excess RF power storage between RFID tags, comprising:
receiving first RF power in first wireless RF signals received by at least one first antenna of a first RFID tag comprising one or more first energy sharing conductors coupled to a first energy storage device;
receiving second RF power in second wireless RF signals received by at least one second antenna of a second RFID tag comprising one or more second energy sharing conductors;
connecting the one or more first energy sharing conductors of the first RFID tag to the one or more second energy sharing conductors of the second RFID tag to form at least a portion of a shared energy storage device from the first energy storage device;
storing excess energy derived from excess received first RF power in the shared energy storage device if the received first RF power exceeds a first operational threshold power for the first RFID tag; and
storing excess energy derived from excess received second RF power in the shared energy storage device if the received second RF power exceeds a second operational threshold power for the second RFID tag.

16. The method of claim 15, further comprising storing energy derived from excess received second RF power in a second energy storage device of the second RFID tag, the second energy storage device coupled to the one or more second energy sharing conductors and forming a portion of the shared energy storage device.

17. The method of claim 16, further comprising coupling the second energy storage device to the first energy storage device to form the shared energy storage device when the one or more first energy sharing conductors of the first RFID tag are connected to the one or more second energy sharing conductors of the second RFID tag;
wherein storing excess energy derived from excess received second RF power further comprises storing excess energy derived from excess received second RF power in the second energy storage device of the shared energy storage device.

18. The method of claim 15, further comprising accessing the stored excess energy in the shared energy storage device to provide power to operate the first RFID tag if the received first RF power from the at least one first antenna is less than the first operational threshold power for the first RFID tag.

19. The method of claim 18, further comprising accessing the stored excess energy in the shared energy storage device to provide power to operate the second RFID tag if the received second RF power from the at least one second antenna is less than the second operational threshold power for the second RFID tag.

20. The method of claim 15, further comprising operating the first RFID tag with the received first RF power from the at least one first antenna if the received first RF power meets or exceeds the first operational threshold power for the first RFID tag.

21. The method of claim 20, further comprising operating the second RFID tag with the received second RF power from the at least one second antenna if the received second RF power meets or exceeds the second operational threshold power for the second RFID tag.

22. The method of claim 15, further comprising sending first communication signals to the second RFID tag when one or more first communications conductors of the first RFID tag are electrically connected to one or more second communications conductors of the second RFID tag.

23. The method of claim 22, further comprising sending an identity of the first RFID tag to the second RFID tag when the one or more first communications conductors of the first RFID tag are electrically connected to the one or more second communications conductors of the second RFID tag.

24. The method of claim 22, further comprising sending second communication signals to the first RFID tag when the one or more first communications conductors of the first RFID tag are electrically connected to the one or more second communications conductors of the second RFID tag.

25. The method of claim 24, further comprising sending an identity of the second RFID tag to the first RFID tag when the one or more first communications conductors of the first RFID tag are electrically connected to the one or more second communications conductors of the second RFID tag.

26. The method of claim 15, further comprising:
receiving third RF power in third wireless RF signals received by at least one third antenna of a third RFID tag comprising one or more third energy sharing conductors coupled to a third energy storage device;
connecting the one or more third energy sharing conductors of the third RFID tag to either: the one or more first energy sharing conductors of the first RFID tag or the one or more second energy sharing conductors of the second RFID tag; and
storing excess energy derived from excess received third RF power in the shared energy storage device if the received third RF power exceeds a third operational threshold power for the third RFID tag.

\* \* \* \* \*